(12) United States Patent
Hohberger et al.

(10) Patent No.: US 8,301,886 B2
(45) Date of Patent: Oct. 30, 2012

(54) METHOD AND APPARATUS FOR ARTICLE AUTHENTICATION

(75) Inventors: Clive P. Hohberger, Glencoe, IL (US); Boris Y. Tsirline, Libertyville, IL (US)

(73) Assignee: ZIH Corp., Wilmington, DE (US)

( * ) Notice: Subject to any disclaimer, the term of this patent is extended or adjusted under 35 U.S.C. 154(b) by 12 days.

(21) Appl. No.: 12/648,961

(22) Filed: Dec. 29, 2009

(65) Prior Publication Data

US 2010/0284531 A1    Nov. 11, 2010

Related U.S. Application Data

(60) Continuation of application No. 11/364,354, filed on Feb. 28, 2006, now Pat. No. 7,664,257, which is a division of application No. 10/164,070, filed on Jun. 6, 2002, now Pat. No. 7,137,000.

(60) Provisional application No. 60/314,926, filed on Aug. 24, 2001.

(51) Int. Cl.
*G06F 12/14* (2006.01)
*H04L 13/02* (2006.01)

(52) U.S. Cl. ............... 713/168; 360/51; 360/52

(58) Field of Classification Search ............ None
See application file for complete search history.

(56) References Cited

U.S. PATENT DOCUMENTS

| | | | |
|---|---|---|---|
| 3,729,362 A | 4/1973 | French et al. | |
| 3,956,615 A | 5/1976 | Anderson et al. | |
| 4,111,121 A | 9/1978 | Borum | |
| 4,132,583 A | 1/1979 | Hodgson | |
| 4,496,237 A | 1/1985 | Schron | |
| 4,516,208 A | 5/1985 | Sakura et al. | |
| 4,663,622 A | 5/1987 | Goldman | |
| 4,691,202 A | 9/1987 | Denne et al. | |
| 4,783,798 A | 11/1988 | Leibholz et al. | |
| 4,807,287 A | 2/1989 | Tucker et al. | |
| 4,839,642 A | 6/1989 | Batz et al. | |
| 4,846,504 A | 7/1989 | Macgregor et al. | |
| 4,855,754 A | 8/1989 | Tanaka et al. | |
| 4,857,893 A | 8/1989 | Carroll | |
| 4,870,459 A | 9/1989 | Ito et al. | |

(Continued)

FOREIGN PATENT DOCUMENTS

AU        743556        9/1998
(Continued)

OTHER PUBLICATIONS

Hao Liping; *Universal Read/Write System and Application of IC Card*; Journal of Tianjin University of Commerce; Article received May 14, 1997; Published Mar. 1998; 6 pages; vol. 2.

(Continued)

*Primary Examiner* — Venkat Perungavoor
(74) *Attorney, Agent, or Firm* — Alston & Bird LLP

(57) ABSTRACT

An authentication method for authenticating an article in a device includes the steps of (a) reading an identification number stored on the article, (b) reading an authentication number stored on the article, (c) determining an input number based at least in part on the identification number, (d) applying an authentication function to the input number to calculate an output number, (e) determining that the article is authentic only if the authentication number corresponds to the output number, and (f) permitting use of the article in the device if the article is authentic, and disabling use of the article in the device if the article is not authentic.

19 Claims, 13 Drawing Sheets

U.S. PATENT DOCUMENTS

| | | | |
|---|---|---|---|
| 4,882,604 A | 11/1989 | Kato et al. | |
| 4,930,915 A | 6/1990 | Kikuchi et al. | |
| 4,961,142 A | 10/1990 | Elliott et al. | |
| 4,970,531 A | 11/1990 | Shimizu et al. | |
| 4,993,068 A | 2/1991 | Piosenka et al. | |
| 5,010,573 A | 4/1991 | Musyck et al. | |
| 5,015,834 A | 5/1991 | Suzuki et al. | |
| 5,024,718 A | 6/1991 | Hannen | |
| 5,036,461 A | 7/1991 | Elliott et al. | |
| 5,041,826 A | 8/1991 | Milheiser | |
| 5,066,978 A | 11/1991 | Watarai et al. | |
| 5,078,523 A | 1/1992 | McGourty et al. | |
| 5,132,729 A | 7/1992 | Matsushita et al. | |
| 5,148,534 A | 9/1992 | Comerford | |
| 5,167,752 A | 12/1992 | Dowling | |
| 5,189,246 A | 2/1993 | Marsh et al. | |
| 5,196,840 A | 3/1993 | Leith et al. | |
| 5,216,464 A | 6/1993 | Kotani et al. | |
| 5,229,587 A | 7/1993 | Kimura et al. | |
| 5,239,294 A | 8/1993 | Flanders et al. | |
| 5,266,968 A | 11/1993 | Stephenson | |
| 5,272,503 A | 12/1993 | LeSueur et al. | |
| 5,282,421 A | 2/1994 | Marsh et al. | |
| 5,283,597 A | 2/1994 | Yoshida et al. | |
| 5,283,613 A | 2/1994 | Midgley, Sr. | |
| D347,021 S | 5/1994 | Adams et al. | |
| 5,318,370 A | 6/1994 | Nehowig | |
| 5,333,960 A | 8/1994 | Nam | |
| 5,340,968 A | 8/1994 | Watanabe et al. | |
| 5,353,009 A | 10/1994 | Marsh et al. | |
| 5,355,413 A | 10/1994 | Ohno | |
| 5,379,344 A | 1/1995 | Larsson et al. | |
| 5,385,416 A | 1/1995 | Maekawa et al. | |
| 5,387,302 A | 2/1995 | Bernard et al. | |
| 5,400,319 A | 3/1995 | Fite et al. | |
| 5,406,890 A | 4/1995 | Marsh et al. | |
| 5,428,659 A | 6/1995 | Renner et al. | |
| 5,452,059 A | 9/1995 | Sekiya | |
| 5,455,617 A | 10/1995 | Stephenson et al. | |
| 5,479,467 A | 12/1995 | Katsumata | |
| 5,491,540 A | 2/1996 | Hirst | |
| 5,491,751 A | 2/1996 | Paulson et al. | |
| 5,507,489 A | 4/1996 | Riebel et al. | |
| 5,510,884 A | 4/1996 | Bov, Jr. et al. | |
| 5,513,169 A | 4/1996 | Fite et al. | |
| 5,519,381 A | 5/1996 | Marsh et al. | |
| 5,528,222 A | 6/1996 | Moskowitz et al. | |
| 5,537,105 A | 7/1996 | Marsh et al. | |
| 5,541,904 A | 7/1996 | Fite et al. | |
| 5,544,273 A | 8/1996 | Harrison | |
| 5,546,163 A | 8/1996 | Asai et al. | |
| 5,557,280 A | 9/1996 | Marsh et al. | |
| 5,566,441 A | 10/1996 | Marsh et al. | |
| 5,568,552 A | 10/1996 | Davis | |
| 5,572,193 A | 11/1996 | Flanders et al. | |
| 5,577,121 A | 11/1996 | Davis et al. | |
| 5,579,088 A | 11/1996 | Ko | |
| 5,614,278 A | 3/1997 | Chamberlain et al. | |
| 5,625,692 A | 4/1997 | Herzberg et al. | |
| 5,625,693 A | 4/1997 | Rohatgi et al. | |
| 5,640,002 A | 6/1997 | Ruppert et al. | |
| 5,660,663 A | 8/1997 | Chamberlain et al. | |
| 5,666,585 A | 9/1997 | Nagira et al. | |
| 5,699,066 A | 12/1997 | Marsh et al. | |
| 5,713,679 A | 2/1998 | Taylor | |
| 5,717,974 A | 2/1998 | Park | |
| 5,724,423 A | 3/1998 | Khello | |
| 5,724,425 A | 3/1998 | Chang et al. | |
| 5,726,630 A | 3/1998 | Marsh et al. | |
| 5,754,656 A | 5/1998 | Nishioka et al. | |
| 5,755,519 A | 5/1998 | Klinefelter | |
| 5,760,916 A | 6/1998 | Dellert et al. | |
| 5,771,291 A | 6/1998 | Newton et al. | |
| 5,781,635 A | 7/1998 | Chan | |
| 5,781,708 A | 7/1998 | Austin et al. | |
| 5,787,174 A | 7/1998 | Tuttle | |
| 5,787,278 A | 7/1998 | Barton et al. | |
| 5,797,060 A | 8/1998 | Thompson | |
| 5,805,703 A | 9/1998 | Crandall | |
| 5,810,353 A | 9/1998 | Baskette et al. | |
| 5,865,390 A | 2/1999 | Iveges | |
| 5,867,102 A | 2/1999 | Souder et al. | |
| 5,875,248 A | 2/1999 | Lewis | |
| 5,881,136 A | 3/1999 | Tasker et al. | |
| 5,892,211 A | 4/1999 | Davis et al. | |
| 5,897,741 A | 4/1999 | Mills et al. | |
| 5,902,437 A | 5/1999 | McDonough et al. | |
| 5,907,739 A | 5/1999 | Tsunemi et al. | |
| 5,907,748 A | 5/1999 | Kawana | |
| 5,909,233 A | 6/1999 | Hamman et al. | |
| 5,917,911 A | 6/1999 | Dabbish et al. | |
| 5,978,483 A | 11/1999 | Thompson et al. | |
| 5,982,295 A | 11/1999 | Goto et al. | |
| 5,995,626 A | 11/1999 | Nishioka et al. | |
| 6,011,937 A | 1/2000 | Chaussade et al. | |
| 6,014,533 A | 1/2000 | Kawana | |
| 6,015,344 A | 1/2000 | Kelly et al. | |
| 6,019,461 A | 2/2000 | Yoshimura et al. | |
| 6,019,865 A | 2/2000 | Palmer et al. | |
| 6,049,289 A | 4/2000 | Waggamon et al. | |
| 6,049,610 A | 4/2000 | Crandall | |
| 6,050,622 A | 4/2000 | Gustafson | |
| 6,068,372 A | 5/2000 | Rousseau et al. | |
| 6,075,997 A | 6/2000 | Lindqvist et al. | |
| 6,092,888 A | 7/2000 | Eade et al. | |
| 6,099,178 A * | 8/2000 | Spurr et al. | 400/207 |
| 6,100,804 A | 8/2000 | Brady et al. | |
| 6,106,166 A | 8/2000 | Spurr et al. | |
| 6,118,379 A | 9/2000 | Kodukula et al. | |
| 6,123,796 A | 9/2000 | Kathmann et al. | |
| 6,130,613 A | 10/2000 | Eberhardt et al. | |
| 6,163,260 A | 12/2000 | Conwell et al. | |
| 6,163,361 A | 12/2000 | McIntyre et al. | |
| 6,163,631 A | 12/2000 | Kawanishi et al. | |
| 6,173,119 B1 | 1/2001 | Manico et al. | |
| 6,188,423 B1 | 2/2001 | Pou | |
| 6,206,292 B1 | 3/2001 | Robertz et al. | |
| 6,227,643 B1 | 5/2001 | Purcell et al. | |
| 6,246,326 B1 | 6/2001 | Wiklof et al. | |
| 6,249,291 B1 | 6/2001 | Popp et al. | |
| 6,263,170 B1 | 7/2001 | Bortnem | |
| 6,271,928 B1 | 8/2001 | Bullock et al. | |
| 6,280,544 B1 | 8/2001 | Fox et al. | |
| 6,285,342 B1 | 9/2001 | Brady et al. | |
| 6,286,762 B1 | 9/2001 | Reynolds et al. | |
| 6,290,138 B1 | 9/2001 | Ohno et al. | |
| 6,295,423 B1 | 9/2001 | Haines et al. | |
| 6,312,106 B1 | 11/2001 | Walker | |
| 6,327,972 B2 | 12/2001 | Heredia et al. | |
| 6,332,062 B1 | 12/2001 | Phillips et al. | |
| 6,334,921 B1 | 1/2002 | Duschek | |
| 6,351,618 B1 | 2/2002 | Pollocks, Jr. | |
| 6,351,621 B1 | 2/2002 | Richards et al. | |
| 6,357,503 B1 | 3/2002 | Kromer et al. | |
| 6,363,483 B1 | 3/2002 | Keshav | |
| 6,375,298 B2 | 4/2002 | Purcell et al. | |
| 6,381,418 B1 | 4/2002 | Spurr et al. | |
| 6,385,407 B1 | 5/2002 | Inose | |
| 6,386,772 B1 | 5/2002 | Klinefelter et al. | |
| 6,404,335 B1 | 6/2002 | Ohno et al. | |
| 6,409,401 B1 | 6/2002 | Petteruti et al. | |
| 6,418,283 B1 | 7/2002 | Wegman et al. | |
| 6,451,154 B1 | 9/2002 | Grabau et al. | |
| 6,473,571 B1 | 10/2002 | Wegman et al. | |
| 6,487,812 B2 | 12/2002 | Johnson | |
| 6,490,352 B1 | 12/2002 | Schroeppel | |
| 6,490,420 B2 | 12/2002 | Pollocks, Jr. | |
| 6,522,348 B1 | 2/2003 | Brot et al. | |
| 6,525,835 B1 | 2/2003 | Gulati | |
| 6,527,356 B1 | 3/2003 | Spurr et al. | |
| 6,532,351 B2 | 3/2003 | Richards et al. | |
| 6,536,660 B2 | 3/2003 | Blankenship et al. | |
| 6,539,867 B2 | 4/2003 | Lee | |
| 6,546,327 B2 | 4/2003 | Hattori et al. | |
| 6,557,606 B1 | 5/2003 | Duschek | |
| 6,557,758 B1 | 5/2003 | Monico | |
| 6,588,658 B1 | 7/2003 | Blank | |

| | | |
|---|---|---|
| 6,592,035 B2 | 7/2003 | Mandile |
| 6,593,853 B1 | 7/2003 | Barrett et al. |
| 6,593,952 B1 | 7/2003 | Funayama et al. |
| 6,597,465 B1 | 7/2003 | Jarchow et al. |
| 6,603,497 B2 | 8/2003 | Hevenor et al. |
| 6,629,134 B2 | 9/2003 | Hayward et al. |
| 6,634,814 B2 | 10/2003 | Spurr et al. |
| 6,636,702 B2 | 10/2003 | Abe |
| 6,644,544 B1 | 11/2003 | Spurr et al. |
| 6,644,771 B1 | 11/2003 | Silverbrook |
| 6,683,638 B2 | 1/2004 | Sato |
| 6,687,634 B2 | 2/2004 | Borg |
| 6,694,884 B2 | 2/2004 | Klinefelter et al. |
| 6,708,005 B2 | 3/2004 | Chihara |
| 6,714,745 B2 | 3/2004 | Sasame et al. |
| 6,722,753 B2 | 4/2004 | Helterline et al. |
| 6,724,895 B1 | 4/2004 | Turner et al. |
| 6,735,399 B2 | 5/2004 | Tabb et al. |
| 6,738,903 B1 | 5/2004 | Haines |
| 6,748,182 B2 | 6/2004 | Yoshida et al. |
| 6,791,704 B1 | 9/2004 | Moreau et al. |
| 6,793,307 B2 | 9/2004 | Spun et al. |
| 6,798,997 B1 | 9/2004 | Hayward et al. |
| 6,802,659 B2 | 10/2004 | Cremon et al. |
| 6,807,380 B2 | 10/2004 | Iida et al. |
| 6,808,255 B1 | 10/2004 | Haines et al. |
| 6,820,039 B2 | 11/2004 | Johnson et al. |
| 6,832,866 B2 | 12/2004 | Klinefelter et al. |
| 6,879,785 B2 | 4/2005 | Ito et al. |
| 6,894,711 B2 | 5/2005 | Yamakawa et al. |
| 6,932,527 B2 | 8/2005 | Pribula et al. |
| 6,954,533 B2 | 10/2005 | Turner et al. |
| 6,963,351 B2 | 11/2005 | Squires et al. |
| 6,986,057 B1 | 1/2006 | Cusey et al. |
| 7,018,117 B2 | 3/2006 | Meier et al. |
| 7,031,946 B1 | 4/2006 | Tamai et al. |
| 7,137,000 B2 | 11/2006 | Hohberger et al. |
| 7,147,165 B2 | 12/2006 | Mongin et al. |
| 7,183,505 B2 | 2/2007 | Mongin et al. |
| 7,206,010 B2 | 4/2007 | Maghakian |
| 7,228,433 B2 | 6/2007 | Turner et al. |
| 7,237,485 B2 | 7/2007 | Meier et al. |
| 7,430,762 B2 | 9/2008 | Klinefelter et al. |
| 7,664,257 B2 | 2/2010 | Hohberger et al. |
| 2001/0027443 A1* | 10/2001 | Hanzawa et al. ............... 705/57 |
| 2001/0029857 A1 | 10/2001 | Heredia et al. |
| 2001/0048361 A1 | 12/2001 | Mays et al. |
| 2001/0056409 A1* | 12/2001 | Bellovin et al. ............... 705/64 |
| 2002/0062898 A1 | 5/2002 | Austin et al. |
| 2002/0145036 A1 | 10/2002 | Otto |
| 2002/0170973 A1 | 11/2002 | Teraura |
| 2002/0195194 A1 | 12/2002 | Grabau et al. |
| 2002/0195195 A1 | 12/2002 | Grabau et al. |
| 2003/0063002 A1 | 4/2003 | Okamoto et al. |
| 2003/0089444 A1 | 5/2003 | Meizer et al. |
| 2003/0128269 A1 | 7/2003 | Squires et al. |
| 2003/0183329 A1 | 10/2003 | Duschek |
| 2003/0189490 A1 | 10/2003 | Hogerton et al. |
| 2004/0109715 A1 | 6/2004 | Meier et al. |
| 2004/0114981 A1 | 6/2004 | Meier et al. |
| 2005/0275708 A1 | 12/2005 | Squires et al. |
| 2006/0123471 A1 | 6/2006 | Fontanella et al. |
| 2006/0203075 A1 | 9/2006 | Vazac et al. |
| 2007/0056027 A1 | 3/2007 | Nehowig et al. |
| 2007/0057057 A1 | 3/2007 | Andresky et al. |
| 2008/0316523 A1 | 12/2008 | Klinefelter et al. |

FOREIGN PATENT DOCUMENTS

| | | | |
|---|---|---|---|
| DE | 196 53 113 A1 | 6/1997 |
| EP | 0 595 549 A3 | 5/1994 |
| EP | 0 878 403 A1 | 11/1998 |
| EP | 1 016 037 B1 | 5/2000 |
| GB | 2 303 613 A | 2/1997 |
| JP | 62(1987)-46281 A | 2/1987 |
| JP | 03-220572 A | 9/1991 |
| JP | 4(1992)-371026 A | 12/1992 |
| JP | 5(1993)-335969 A | 12/1993 |
| JP | 6-124369 A | 5/1994 |
| JP | 9-104189 A | 4/1997 |
| JP | 409-185324 A | 7/1997 |
| JP | 11-263025 A | 9/1999 |
| JP | 2000-062273 A | 2/2000 |
| JP | 2000-246921 A | 9/2000 |
| JP | 2000-355146 A | 12/2000 |
| JP | 2001-001424 A | 1/2001 |
| JP | 2001-096814 A | 4/2001 |
| JP | 2001-215779 A | 8/2001 |
| JP | 2001-510912 A | 8/2001 |
| JP | 2002-334313 A | 11/2002 |
| JP | 2003/011931 A | 1/2003 |
| JP | 2003/011939 A | 1/2003 |
| JP | 2003/159838 A | 6/2003 |
| JP | 2003/207984 A | 7/2003 |
| RU | 2 120 387 C1 | 10/1998 |
| RU | 2 147 790 C1 | 4/2000 |
| SE | 9604402-9 | 5/1998 |
| SU | 1 069 276 A1 | 11/1997 |
| WO | WO 96/08092 A1 | 3/1996 |
| WO | WO 96/28941 A1 | 9/1996 |
| WO | WO 97/11530 A1 | 3/1997 |
| WO | WO 98/39734 A1 | 9/1998 |
| WO | WO 98/52762 A | 11/1998 |
| WO | WO 00/07807 A1 | 2/2000 |
| WO | WO 00/43932 A2 | 7/2000 |
| WO | WO 00/47410 A1 | 8/2000 |
| WO | WO 01/00492 A1 | 1/2001 |
| WO | WO 01/15382 A1 | 3/2001 |
| WO | WO 01/57807 A1 | 8/2001 |
| WO | WO 01/61646 A1 | 8/2001 |
| WO | WO 02/35463 A2 | 5/2002 |
| WO | WO 03/019459 A2 | 3/2003 |
| WO | WO 03/029005 A2 | 4/2003 |

OTHER PUBLICATIONS

Tan Xuebin, Yang Xingzi, Ge Yuanqing, Zeng Ying; *The Development of a Contract-less IC Card Used as ID Card*; Micoelectronics; Article received Nov. 10, 1997; Published Jun. 1998; 6 pages; vol. 28, No. 3.

Luan Da, Li Xingyi, Tu Shiliang; *The Encryptive Mechanism and Applications of Smart Card*; Computer Engineering; Article received Nov. 18, 1996; Published May 1997; 6 pages; vol. 23, No. 3.

Ji Fenghua, Rong Taiping, Wang Jun; *A Practical Encryption Method Based on IC Card*; Article received Jan. 8, 1997; Published 1997; vol. 6.

Blahut, R. E., *Theory and Practice of Error control Codes*, Chapter 4, The Arithmetic of Galois Fields, Addison-Wesley Publishing Company, 1993, p. 65, 80, 81, 82, 83.

Chang, C.C., et al., *Using Smart Cards to Authenticate Passwords*, Security Technology, 1993, Security Technology, Proceedings, Institute of Electrical and Electronics Engineers 1993 International Carnahan Conference on Oct. 13-15, 1993, pp. 154-156.

Gupta, R. et al.; *On Randomization in Sequential and Distributed Algoritym*, ACM Computing Surveys (CSUR), vol. 26, Issue 1 (Mar. 1994), pp. 7-86.

Hohberger, C. P., A "White Paper" on the Development of AIM Industry Standards for 13.56 MHz RFID Smart Labels and RFID Printer/Encoders, dated May 24, 2000.

Menezes, A. et al., *Handbook of Applied Cryptography*, CRC Press, 1997, pp. 389, 394, 395, 399, 401.

Stallings, W., *Key Management; Other Public-Key Cryptosystems, Cryptography and Network Security Principles and Practice*, Third Edition, Upper Saddle River, NJ, Prentice Hall, 2003, pp. 293-296.

Tu, K., *An ID-Based Cryptographic Technique for IFF*, Military Communications Conference, 1995 Milcom '95, Conference Records, IEEE, vol. 3, Nov. 8, 1995, pp. 1258-1262, vol. 3.

3 pages from http://www.fargo.com/Products/ribbons.asp dated Jan. 17, 2001 regarding FARGO Electronics: card printer ribbons.

4 pages from Eltron® Card Printer Products re P200 Series Card Printers.

Motorola announces BiStatix 125KHz RFID tag, Transponder News Press Release, Mar. 2, 1999.

RFID Technology & Smart Labels, dated Sep. 14, 1999.

Bielomatik—One(1) page from http://www.bielomatik.de/sixcms/detail.php?id=906&template=schema_detail_en Apr. 1, 2003 re Multi-Web Lamination process flow: Smart Tickets (Compact Version).

Bielomatik—Two (2) pages from http://www.bielomatik.de/sixcms/detail.php?id=876&template=masch_detail_en Apr. 1, 2003 re TLA-100 Transponder and Label Attaching Machine.

Bielomatik—One (1) page from http://www.bielomatik.de/sixcms/detail.php?id=903&template=masch_detail_en Apr. 1, 2003 re Multi-Web Lamination process flow: Smart Labels (Compact Version).

Biolomatik—Two (2) pages from http://www.bielomatik.de/sixems/detail.php?id=877&template=masch_detail_en Apr. 1, 2003 re TTL-100 Transponder and Ticket Laminating Machine.

Bielomatik—Two (2) pages from http://www.bielomatik.de/sixcms/detail.php?id=874&template=masch_detail_en Apr. 1, 2003 re TAL-100 Transponder Attaching and Laminating Machine.

Bielomatik—One (1) page from http://www.bielomatik.de/sixcms/detail.php?id=908&template+schema_detail_en 04/01/203 re Multi-Web Lamination process flow: Smart Labels, Tags and (sic) Tickets.

International Search Report for Application No. PCT/US02/26617 dated Mar. 20, 2003.

The Supplementary European Search Report for European Patent Application No. 02 75 9421, completed Oct. 30, 2008.

U.S. Appl. No. 60/117,123, filed Jan. 25, 1999 entitled Ribbon Core Identification Coding Device.

U.S. Appl. No. 60/459,712, filed Apr. 2, 2003 entitled *Inverted Identification Card Printing and Ribbon Cartridge*.

U.S. Appl. No. 60/497,009, filed Aug. 19, 2003 entitled *Identification Card Printer and Ribbon Cartridge*.

U.S. Appl. No. 60/314,926, filed Aug. 24, 2011 entitled *Method and Apparatus for Consumable Authentication*.

U.S. Appl. No. 12/479,504, filed Jun. 5, 2009, in re: Turner et al., entitled *Electronic Identification System and Method with Source Authenticity*.

Office Action for U.S. Appl. No. 12/479,504 dated Jan. 21, 2011.

Office Action Response for U.S. Appl. No. 12/479,504 dated Jul. 21, 2011.

Final Office Action for U.S. Appl. No. 12/479,504 dated Aug. 22, 2011.

Office Action for U.S. Appl. No. 10/164,070 dated Jul. 2, 2004.

Office Action Response for U.S. Appl. No. 10/164,070 dated Jul. 19, 2004.

Office Action for U.S. Appl. No. 10/164,070 dated Jul. 29, 2005.

Office Action Response for U.S. Appl. No. 10/164,070 dated Nov. 14, 2005.

Supplemental Office Action Response for U.S. Appl. No. 10/164,070 dated Jan. 18, 2006.

Office Action for U.S. Appl. No. 11/364,354 dated Sep. 26, 2007.

Office Action Response for U.S. Appl. No. 11/364,354 dated Jan. 25, 2008.

Final Office Action for U.S. Appl. No. 11/364,354 dated Mar. 5, 2008.

Office Action for U.S. Appl. No. 11/364,354 dated Sep. 18, 2008.

Office Action Response for U.S. Appl. No. 11/364,354 dated Dec. 17, 2008.

Office Action for U.S. Appl. No. 11/364,354 dated Feb. 25, 2009.

Office Action Response for U.S. Appl. No. 11/364,354 dated Jul. 27, 2009.

Supplemental Office Action Response for U.S. Appl. No. 11/364,354, dated Aug. 19, 2009.

* cited by examiner

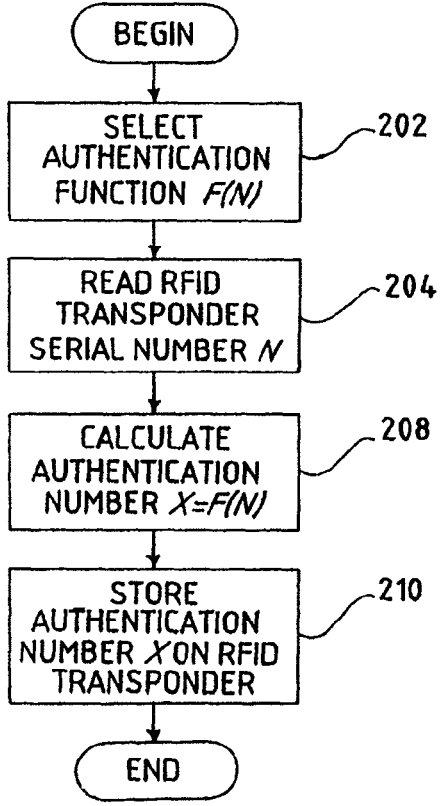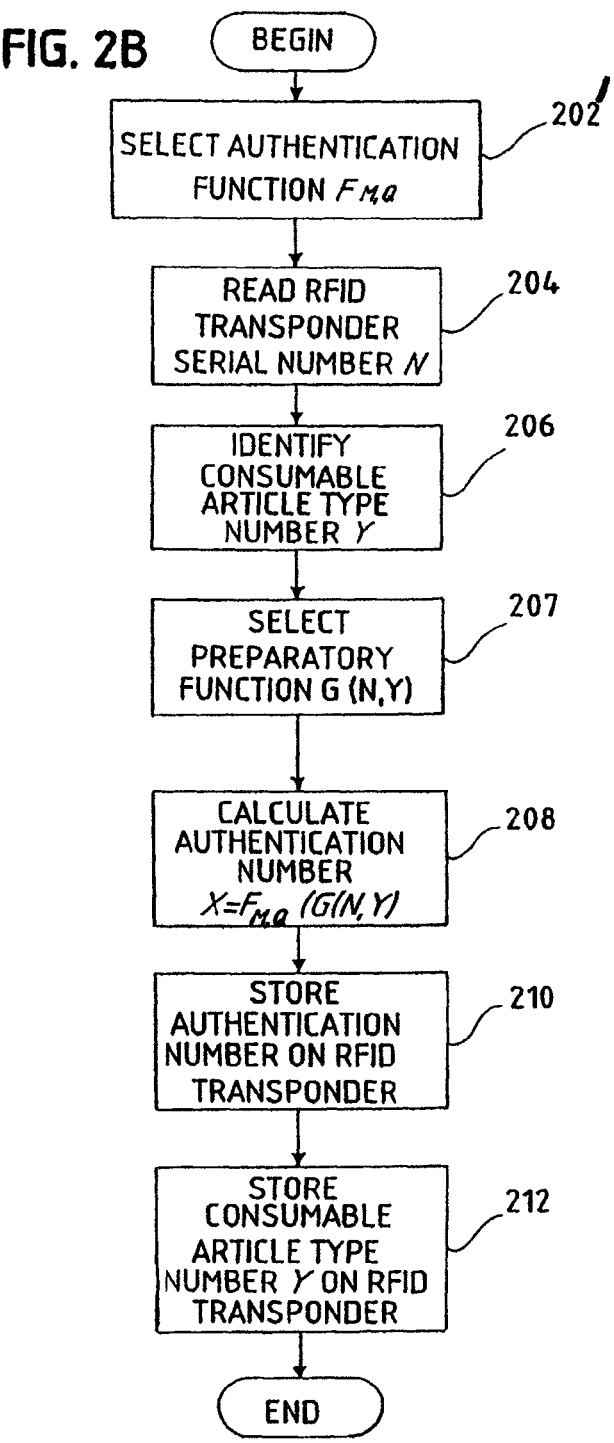

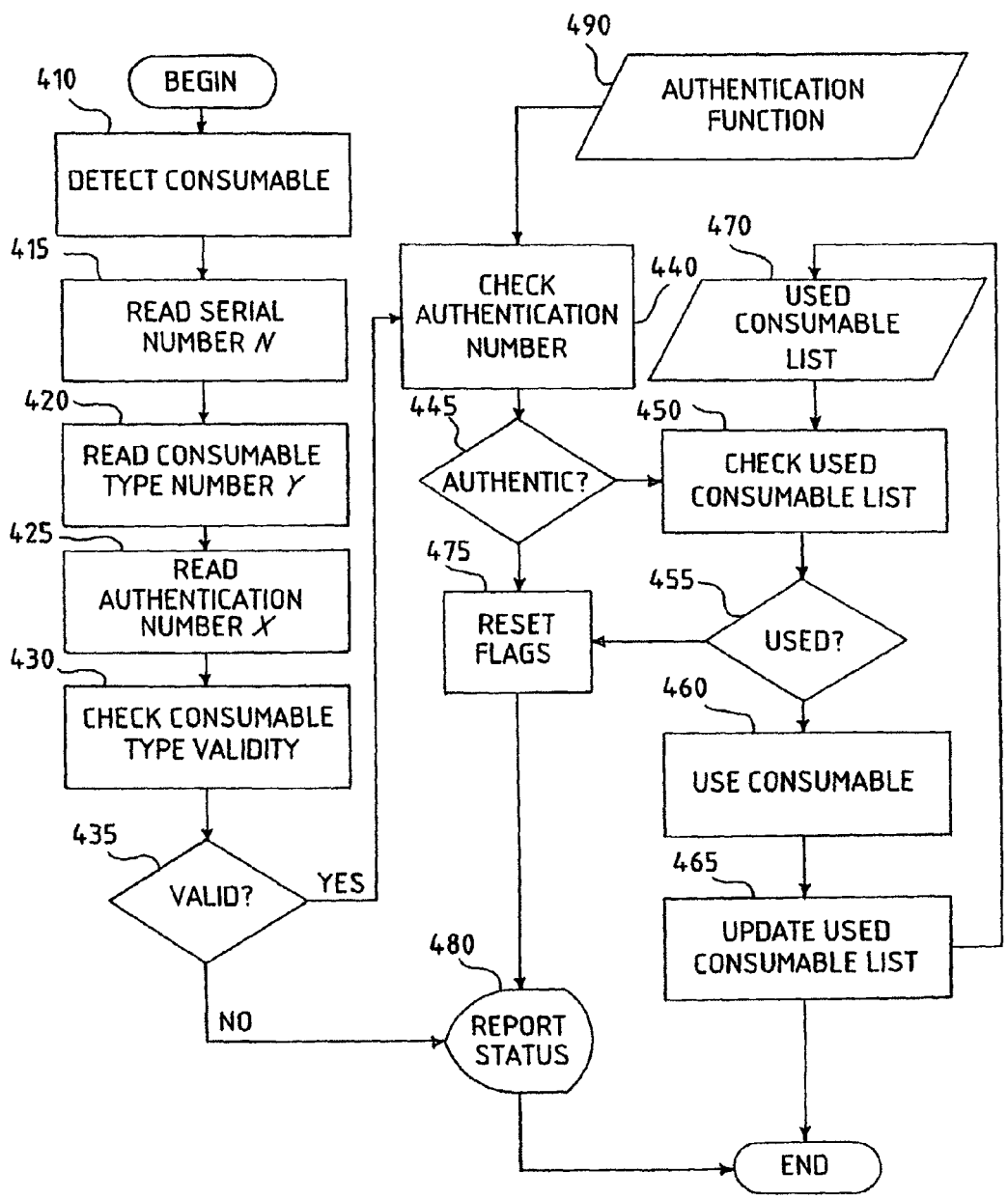

1010

1015
1010

METHOD AND APPARATUS FOR ARTICLE AUTHENTICATION

CROSS-REFERENCE TO RELATED APPLICATIONS

This application is a continuation of application Ser. No. 11/364,354, filed Feb. 28, 2006 now U.S. Pat. No. 7,664,257, entitled Method and Apparatus for Article Authentication, which is a divisional of application Ser. No. 10/164,070, filed Jun. 6, 2002 now U.S. Pat. No. 7,137,000, and claims benefit of provisional application 60/314,926 filed Aug. 24, 2001, entitled Method and Apparatus for Consumable Authentication, all of which are incorporated herein by reference in their entirety.

FIELD OF THE INVENTION

This invention relates generally to an authentication technique for an article used in a host device. More specifically, one particular embodiment of this invention relates to an improvement to an ink cassette or cartridge in a thermal marking apparatus wherein the ink cassette or ribbon cartridge may be authenticate as being of a suitable type and coming from an authorized source.

BACKGROUND

Other approaches have been tried for authenticating consumables in a host, but none of these have proven satisfactory. In particular, the background approaches discussed below do not provide an effective anti-piracy deterrent. These previously known approaches do not provide adequate authentication and can often be defeated by copying, spoofing, or similar techniques.

One early technique to authenticate consumables relied on keyed shapes of the consumable. Such keyed shapes can be designed so that only a consumable in the keyed shape will fit into a given type of host. As one example, a particular brand of razor can be adapted to receive only razor blades having a particular keyed shape. As a second example, an ink jet printer can be adapted to receive only refill ink cartridges having a particular keyed shape. The use of such a keyed shape can prevent interchange of consumables between different types of host. That approach is generally ineffective for anti-piracy, however, because the keyed shape of the consumable can be readily observed and easily duplicated.

Also unsatisfactory are the "challenge and response" authentication algorithms used in transponders intended for automobile security systems, such as the Atmel TK556, and equivalents. Automotive security systems were designed for "one lock, few keys" applications, where a single secret number is programmed into each key and each lock. If a host device, such as a printer or a camera, is the "lock," then such challenge-response transponders require that all the keys (media) and locks (printers) be programmed with the same secret number.

It is known to provide encodements on consumables, such as film units and/or hosts such as cameras, for identification purposes and to convey information about the film unit or camera. The term "encodement" very broadly describes a feature of physical media used to communicate one or more pieces of information to a machine. "Encodement" includes alphanumeric text and other indicia, symbols, and the like. An encodement can be detectable by various means, including but not limited to optical, magnetic, and/or punch readers.

U.S. Pat. No. 6,106,166 discloses a device having a transponder and a transceiver. An electrically or electronically programmable read/write memory contained in the transponder is integrally attached to a consumable. The transponder is capable of receiving a first RF frequency electromagnetic field and deriving power and address information therefrom, and then generating a second RF frequency electromagnetic field in response. The second electromagnetic field is characteristic of the data stored in memory. A transceiver is disposed within the host with an antenna and support components for polling each transponder. As instructed by a control logic processor, the transceiver can read manufacturing data from the transponder and write usage and processing data to the transponder for storage in memory.

Radio-frequency identification transponders are widely available in a variety of forms. One form, referred to as "inlay transponders" are identification transponders that have a substantially flat shape. The antenna for an inlay transponder is in the form of a conductive trace deposited on a non-conductive support. The antenna may have the shape of a flat coil and the like. Leads for the antenna are also deposited, with non-conductive layers interposed as necessary. Memory components, RF communications, and any control functions are provided by a chip mounted on the support and operatively connected through the leads to the antenna. Inlay transponders have been used as layers of identification tags and labels to provide encodements that are accessible at a distance. A camera having a radio-frequency identification transponder that can be accessed for writing and reading at a distance is disclosed in U.S. Pat. No. 6,173,119.

Another known type of transponder is a radio frequency identification (RFID) transponder. An RFID transponder can typically include a unique identifier installed by the manufacturer in non-volatile memory.

With respect to host devices, it is known to provide a consumable article, such as a print cartridge, with a transponder. The host device, such as a printer into which the cartridge is installed, includes a transceiver for detecting the type of media on the print cartridge. A transceiver and transponder of this general type are disclosed in U.S. Pat. No. 6,099,178 to Spurr et al. The Spurr patent discloses a printer adapted to sense the type of media installed and includes a radio frequency transceiver for transmitting a first electromagnetic field, and for sensing a second electromagnetic field. However, Spurr does not teach or suggest a means for authenticating the media bearing the transponder. The information encoded in the transponder in Spurr can be easily forged, thus rendering the system ineffective as an anti-piracy measure.

International Publication Number WO 98/52762 discloses an inkjet printer that uses an RFID tag for identifying the type of paper that is loaded in an inkjet printer. That approach offers contactless communication with a read/write memory that is added to the inkjet roll. That publication, however, does not teach or suggest an authentication method and apparatus in accord with this disclosure.

A need exists, therefore, for an effective anti-piracy measure using a transponder and transceiver for sensing information encoded on a consumable article for use in a host device, such as media for use in a printer.

BRIEF DESCRIPTION OF THE DRAWINGS

It is believed that the invention will be better understood from the following description when taken in conjunction with the accompanying drawings, wherein:

FIG. 2A is a program flowchart depicting one embodiment of a sequence of operations to prepare an authenticatable consumable article.

FIG. 2B is a program flowchart depicting one embodiment of a sequence of operations to prepare an authenticatable consumable article.

FIG. 4 is a system flow chart illustrating a sequence of operations and flow of data in one embodiment of a method for authenticating a consumable.

DETAILED DESCRIPTION

The present description is directed in particular to elements forming part of, or cooperating more directly with, the apparatus in accordance with the invention. It is to be understood that elements not specifically shown or described can take various forms known to those skilled in the art. In this description the term "consumable" refers to a component designed to be used up and replaced in a device referred to as a host. Examples of consumables and their respective hosts include ink jet reservoirs for use in printers, film for use in cameras, a ribbon for use on a typewriter, and/or a toner cartridge for use in a copier.

Figure 1A:
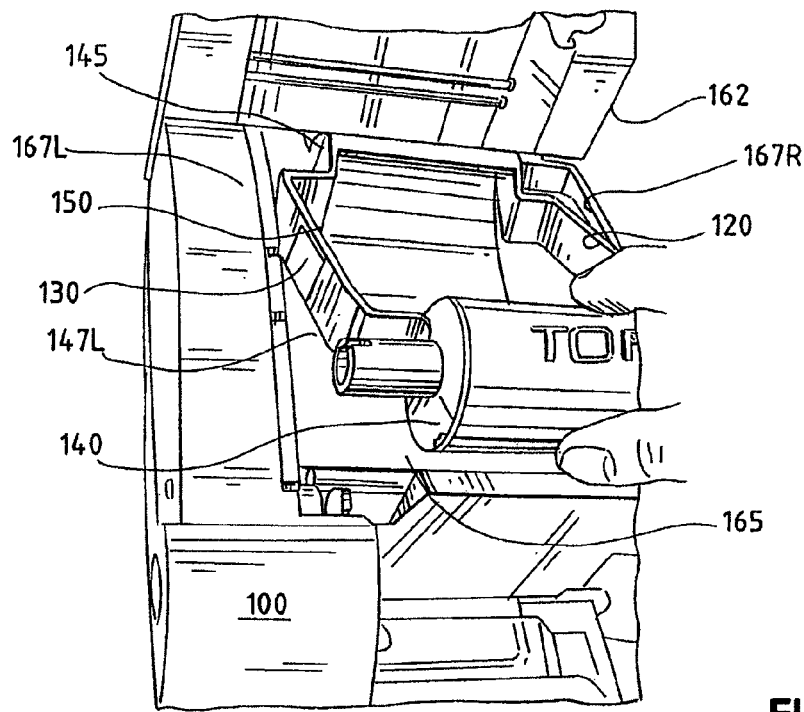
FIG. 1A is a top left perspective view of a consumable article being loaded into a host device in accordance with one embodiment.

Referring now to FIG. 1A, a host device (100) is configured to receive a consumable article (120). The host device (100) in this specific embodiment may be a plastic card printer for printing bar codes on plastic cards using a thermal transfer process. The consumable article (120) of this embodiment may be a ribbon cartridge containing a ribbon (150) such as, for example, a resin thermal transfer ribbon or dye sublimation ribbon. A plastic card printer host device (100) can include other conventional components (not show) such as, a print head, magnetic encoder station, power switch, control panel, card feeder, card output hopper, and other components. An openable printer cover (162) conceals the internal mechanism of the ribbon cartridge consumable article (120) and helps limit entry of contaminants, such as dust and particulate matter. A cover release button (160) is shown on one side of the plastic card printer host device (100) in this embodiment. A second cover release button (not shown) may be located on the opposite side. A left interior wall (167L) and a right interior wall (167R) define a slot (165) in the plastic card printer host device (100) for receiving the ribbon cartridge consumable article (120) in this embodiment. The ribbon cartridge consumable article (120) may be loaded into the plastic card printer host device by first pressing the cover release button (160) on a side of the plastic card printer host device (100) to open the printer cover (162) then inserting the ribbon cartridge consumable article (120) vertically into the slot (165) and pressing the ribbon cartridge consumable article (120) into place. Tactile or audible feedback can indicate that the ribbon cartridge consumable article (120) has been properly seated.

Still referring to the embodiment shown in FIG. 1A, the ribbon cartridge consumable article (120) may include a source spool (140) and a take-up spool (145). Before the ribbon cartridge consumable article (120) is used, the ribbon (150) is disposed in a roll wound about the source spool (140). As the ribbon (150) is used and the ribbon cartridge consumable article (120) is consumed, the ribbon (150) wraps around the take-up spool (145). The source spool (140) and the take-up spool (145) are spaced apart in a fixed relationship in the pictured embodiment by a left brace member (147L) and a right brace member (147R). The source spool (140), the take-up spool (145), the left brace member (147L), and the right brace member (147R) together comprise four sides defining a rectangular shaped space through which the ribbon (150) passes. In the embodiment depicted in FIG. 1A, a radio frequency identification (RFID) transponder (130) is provided on the left brace member (147L) of the ribbon cartridge (120). Although in the pictured embodiment the RFID transponder (130) is disposed on the left brace member (147L), in practice it can also be placed at any suitable location, such as on the right brace member (147R). Of course, the transponder need not be limited to radio frequency signals, and may utilize any form of suitable electromagnetic radiation, such as visible, ultraviolet and infra-red light, as is known in the art.

In accord with the illustrated embodiment of FIG. 1A, the RFID transponder (130) may contain a unique, factory-programmed serial number n. Certain commercially available RFID transponders each contain a unique 32 to 64-bit transponder serial identification number, n, used in the "anti-collision" protocol. This protocol enables separation and unique identification of several transponders simultaneously appearing in the field of the RFID reader, which may be caused by multiple host devices being located in relatively close proximity.

An authentication number, x, is calculated using an encryption function, F, selected by and confidential to the manufacturer of the ribbon cartridge consumable article (120). The authentication number is permanently stored on the RFID transponder (130). The encryption function F is made available to the printer host device (100) during operation thereof. For example, in one embodiment shown in FIG. 8, the confidential encryption function F can be programmed into the printer host device (100) before during manufacture. In another embodiment, the confidential encryption function F is made available to the printer host device (100) over a network. When the ribbon cartridge consumable article (120) is loaded into the printer host device (100), the printer's internal RFID transceiver (not shown in FIG. 1A) reads the values of the serial number, n, and the authentication number, x, from the RFID transponder (130) attached to or on the ribbon cartridge consumable article (120). It then determines whether the authentication number x matches the serial number n as transformed by the confidential encryption function F. If the values agree, then the ribbon cartridge consumable article (120) is deemed to be an authentic media product that is useable on that printer.

Every printer (100) from a given manufacturer may be programmed with the same encryption algorithm at the factory. When the ribbon cartridge consumable article (120) is produced, the same encryption algorithm used to generate the authentication number is provided in the printer. Once the ribbon cartridge consumable article (120) is installed, the transponder's unique serial number, n, is read. In a preferred embodiment, transponder's unique serial number, n, is already locked into the RFID transponder (130) memory by the manufacturer.

The manufacturer of the ribbon cartridge consumable article (120) also knows the type of media to be made, y. In another embodiment, the values of both n and also y are combined to be used in the encryption algorithm to calculate the authentication code x. The manufacturer of the ribbon cartridge consumable article (120) then programs and locks the values x and y into the transponder (130) memory. The transponder (130) is permanently mounted on to the ribbon cartridge consumable article (120). An effectively unlimited number of unique media rolls or cassettes can be produced in this manner, each containing a uniquely programmed and locked value of serial number n, media type number y, and authentication number x.

Although the serial number n, media type number y, and the authentication number x are freely readable, the confidential encryption function, F, are preferably selected from a known class of functions having no obvious inverse. Accordingly, such functions are difficult to decode, thus providing secure authentication. A ribbon cartridge consumable article (120) counterfeiter would have to reconstruct the algorithm F available to the printer (100) in order to make a counterfeit ribbon cartridge consumable article (120) work on a printer (100) according to the embodiment depicted in FIG. 1.

If a value of x is calculated as some complicated function of the unique and non-copyable transponder serial number n, then the values of n and x can both be stored on the RFID transponder (130), where both numbers are unencrypted and readable by anyone. Optionally, if a media type number, y, is also used in the transformation, it can also be stored on the RFID transponder. When the ribbon cartridge consumable article (120) is installed on the printer (100), the printer can read both x and n (and, optionally, y) from the transponder and validate that the read value of x is correct for the read value of n (and optionally, y), thus validating the ribbon cartridge consumable article (120) for the corresponding printer (100).

Judicious selection of an algorithm for F from among known strong encryption algorithms can make the breaking of this security system very difficult and, in practice, prohibitively expensive. The authentication code x can be calculated using cryptographic methods by applying some function to encrypt n. The only information available to the counterfeiter is that a given ribbon's authentication code x is correct for a given serial number n. More particularly, the counterfeiter will not know or be able to learn how the value of x was obtained for a given n. Nor can the counterfeiter randomly try all possible values of n, because the associated values of x will not be known unless the counterfeiter has obtained a valid media roll having both that n and the correct authentication code x. Thus, the counterfeiter has only limited samples of n, x to test.

The same is true for embodiments in which x is calculated as a function of both the serial number n and the media type number y. The authentication code x can be calculated using cryptographic methods by applying some function to encrypt n and y. Again, the only information available to the counterfeiter is that a given ribbon's authentication code x is correct for a given pair n, y.

As a further defense against the security system being compromised, a plurality of functions defining acceptable relations among the test values can be stored on the host device. The consumable article can then be programmed with a plurality of authentication codes, each of which satisfies a particular authentication functional relationship. If it is learned that any particular authentication function has been compromised, then media can be validated using one of the other authenticating functions and authentication values. The compromised authentication function can be disabled in the host device to prevent authentication of pirated media made using the compromised authentication function. For example, the compromised authentication function can be disabled in response to a flag set in subsequent media or by updates to the host device software or firmware.

As is know in the art, the host device or printer (100) includes suitable memory; such as RAM, ROM, EEPROM and the like, input/output devices, computer or central processor, optional disc storage and associated support devices, all of which are not shown. The computer may be, for example, an IBM compatible computer having, for example, a Pentium® or Intel family microprocessor. Alternatively, the computer may be APPLE® compatible having a Motorola family microprocessor. However, the computer or central processor may be any computer, processor, central processing unit (CPU), microprocessor, RISC (reduced instruction set computer), mainframe computer, work station, single chip computer, distributed processor, server, controller, microcontroller, discrete logic device, remote computer, interne computer or web computer. The memory and/or the disk storage associated with the computer is configured to store program instructions representing the algorithms and processing steps described herein. Such program instructions may be "downloaded" from disk storage or from non-volatile memory, such as ROM, PROM, EPROM, and the like, or may be downloaded from a remote source via a network or other communication link.

Figure 1B:
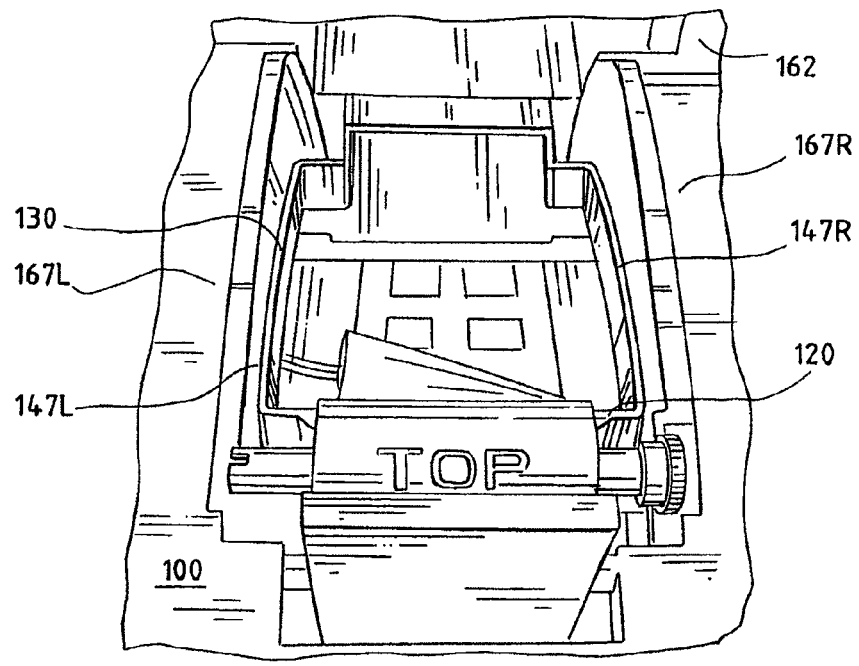
FIG. 1B is a top front perspective view of a consumable article loaded into a host device in accordance with one embodiment.

Referring now to the embodiment shown in FIG. 1B, there is shown the plastic card printer host device (100) and ribbon cartridge consumable article (120). In FIG. 18 the ribbon cartridge consumable article (120) is shown loaded into the plastic card printer host device (100). The ribbon cartridge consumable article (120) in this particular embodiment may be inserted between left internal wall (167L) and right internal wall (167R). The RFID transponder is shown mounted on left brace member (147L), but could be mounted elsewhere such as the right brace member (147R). With the ribbon cartridge consumable article (120) loaded, the cover (162) can be closed and the plastic card printer host device (100) operated.

For simplicity of description, the execution of the invention next described will employ only the serial number n and the authentication number x. However, it is also within the scope of the invention to use a media type number y in conjunction with the serial number n to compute the authentication number x. The use of the serial number n can differ from the use of the media type number y in that the serial number can be permanently fixed in the RFID transponder when it is manufactured and can be unique to each transponder. On the other hand, the media type number y can be stored in the RFID transponder at the factory and is the same for each media of a given type. However, the use of the serial number n in the authentication or encryption calculations described here is the same as the use of the media type number y.

FIG. 2A is a program flow chart that illustrates one embodiment of a sequence of operations for preparing an authenticatable consumable article to use in a host device. First the manufacturer must choose a suitable authenticating function, which choice is represented by the select authentication function F process (202). The function F if is preferably very difficult to identify given only comparatively few values of x and n. After the select authentication function F process (202), the next step is a read RFID transponder serial number n process (204). The manufacturer of the authenticatable consumable article must read the serial number n from the RFID transponder to be installed on the consumable article. The serial number n is factory installed, and is unique to each transponder. Next, the manufacturer may perform a calculate authentication number x=F(n) process (208). The domain of the function F is not limited to the set of values of n, and in particular F can be a multivariable function as discussed is greater detail below. Having calculated authentication number x with the calculate authentication number x=F(n) process (208), next the authentication number x is placed in the public data area of the transponder with the store authentication number x on RFID transponder process (210).

An alternative embodiment of a sequence of operations for preparing an authenticatable consumable article to use in a host device is illustrated in FIG. 2B. In this embodiment, the manufacturer first selects an authentication function with a select authentication function $F_{M,Q}$ process (202'). The authentication function $F_{M,Q}$ of the process of this alternative embodiment is preferably a classic one-way function used in cryptography, which may be based on the modulo operation and Galois Field arithmetic. Galois Field arithmetic, particularly with the one-way function ($[M^G \bmod Q]$, is widely used in public key cryptography. As one example, Diffie-Hellman methods employ this approach. The selection of the parameters M and Q uniquely determines the function $F_{M,Q}(G)=M^G \bmod Q$. As an example, the "modulus" notation may be referred to in an English language sentence in the following way, as is known in the art:

The value of the function of G is equal to the value of M raised to the power of the value of G "modulo" the value of Q.

The parameters M and Q are two prime values, which are related by M being the primitive element of a prime Galois Field GF(Q) of order Q. After settling on an encryption function in the select authentication function $F_{M,Q}$ process (202'), the next step is the read RFID transponder serial number n process (204). The next step in the embodiment of FIG. 2B, is an identify consumable article type y process (206). The number y is a part number selected by the manufacturer to identify a particular type of media to which the manufacturer will affix this particular RFID transponder. The next step is the select preparatory function G(n,y) process (208). The range of the function G(n,y) becomes the domain of the function $F_{M,Q}(G)$, such that the input values n, y are mapped by the composite function F·G to the authentication number x. The function G(n,y) is preferably unique and preferably secret to the manufacture of the authenticatable consumable article. The preparatory function G(n,y) can preferably map each pair n, y to a unique result, although such a one-to-one mapping is not a requirement of the invention. The preparatory function G(n,y) should preferably avoid certain degenerative, pathological values of G. Specifically, the function should preferably avoid resulting in values in the ranges:

$$G \leq 0,$$
$$G = 1,$$
$$G = \frac{Q-1}{2}, \text{ and}$$
$$G = (Q-1).$$

As is known from Galois Field number theory, functions G that produce these values can compromise the security of the encryption function $F_{M,Q}$. An appropriate preparatory function G(n,y) having been selected, the next step in the sequence of operations shown in the particular embodiment illustrated in FIG. 2B is a calculate authentication number $x=F_{M,Q}(G(n,y))$ process (208). After being calculated, the authentication number x is stored in the public data area on the RFID transponder of one embodiment in the store authentication number x on RFID transponder process (210). Additionally, the number y identifying the media type is stored on the transponder in a store consumable article type number y on RFID transponder process (212), after which the sequence of operations depicted in the embodiment of FIG. 2 for making the consumable media authenticatable is complete.

Figure 3A:
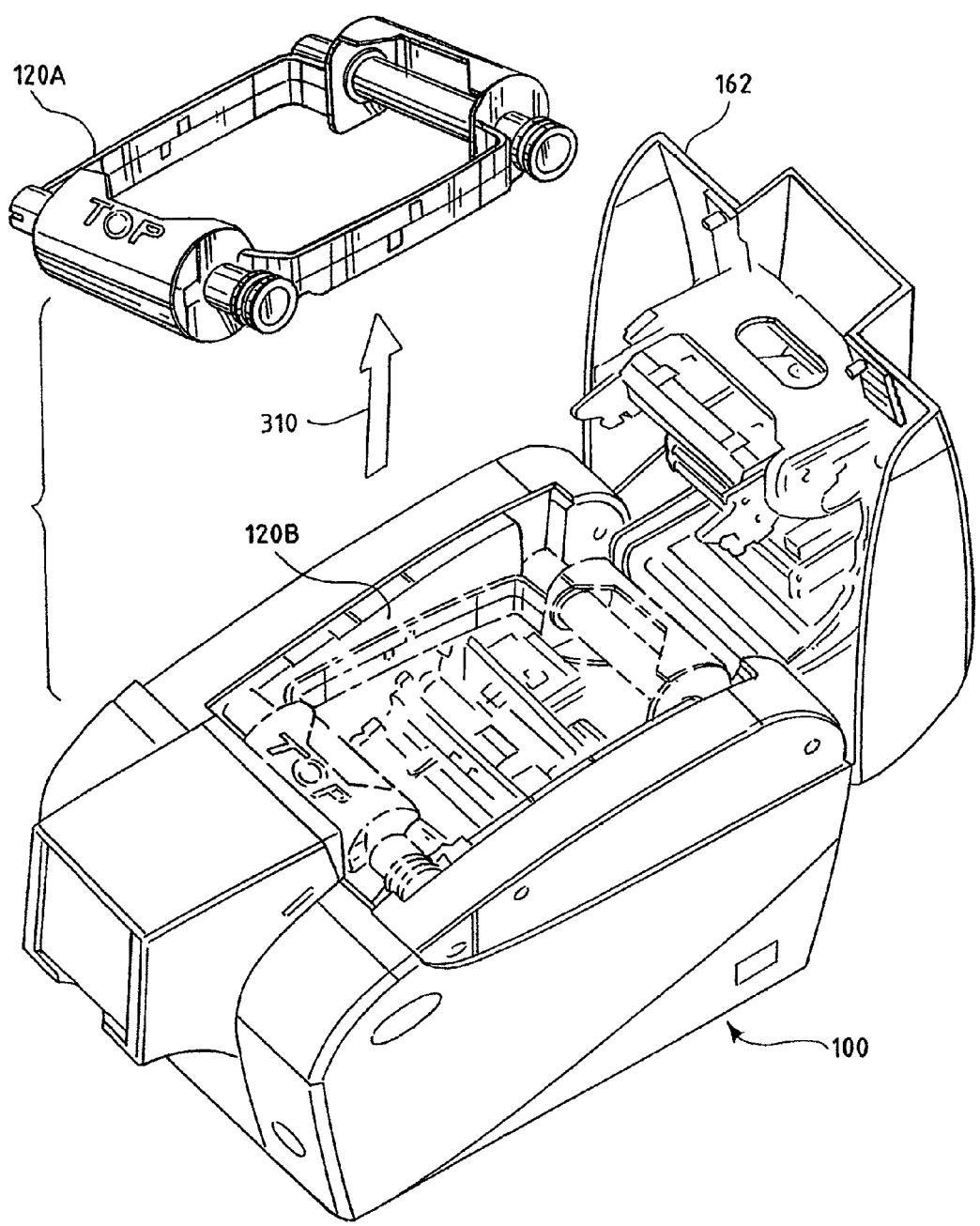
FIG. 3A is a top right perspective view of a consumable article to be authenticated and a host device in accordance with one embodiment.
Figure 3B:
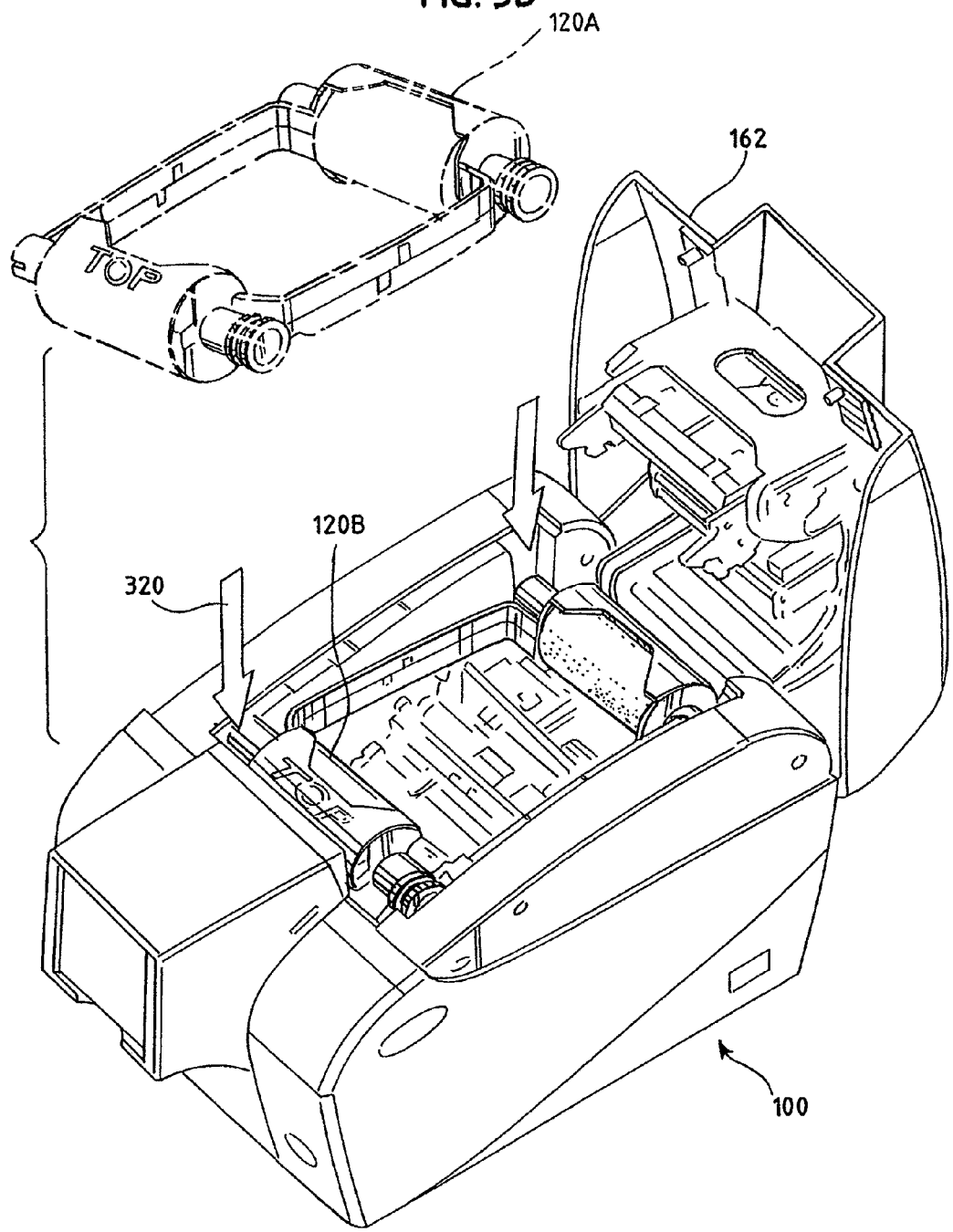
FIG. 3B is a top right perspective view of a consumable article for authentication and a host device for authenticating the invention in accordance with one embodiment.

FIGS. 3A and 3B illustrate another embodiment unloading and loading a consumable article (120A, 120B) out of and into a host device (100) in which the consumable article (120A, 120B) is a ribbon cartridge and the host device (100) is plastic card printer. To unload a ribbon cartridge consumable article (120A, 120B) from a plastic card printer host device (100) after the consumable article has been used, the lid (162) is opened then the ribbon cartridge consumable article in the host device (120B) is lifted out (310), removing the ribbon cartridge consumable article (120A). To load the ribbon cartridge consumable article (120A), it is inserted vertically (320) and pressed into place (120B).

FIG. 4 is a system flowchart that generally depicts the flow of operations and data flow of a system for one specific embodiment for checking the authenticity of a consumable article loaded in a host device. When a consumable article media is installed on a printer host device, the host device first senses the newly loaded consumable article in a detect consumable article process (410). The consumable article can be detected by a mechanical sensor, by recognizing the proximity of an RFID transponder, or by any other suitable sensor means for such detection. After detection of the new consumable article, the printer's internal RFID transceiver reads from transponder on the installed media the values of the serial number n, authentication number x, and consumable type y.

This is shown in the embodiment illustrated in FIG. 4 as three successive processes, a read serial number n process (415), a read consumable type number y process (420), and a read authentication number x process (425). The order of these operations is not important and can be performed in a different sequence in other embodiments without departing from the scope of the invention. After reading the consumable type number y, in the illustrated embodiment of FIG. 4, the validity of the consumable for the particular host is tested in a check consumable type validity process (430). In this embodiment valid types of media y for the particular host device are known. If the consumable is of a type invalid for the particular host, the host will report the status of an incompatible cartridge using a report status process (480) and terminate. If the media type is incompatible with the particular host, it is unnecessary to check authenticity of the media.

Referring still to the embodiment of FIG. 4, authentication function data (490) is available for use in checking the authenticity of the consumable media. The host device may be programmed before it is sold with the same authentication function later used to make consumable articles for use in the host device. The sequence of steps defining the authentication function can be stored in the host device as authentication function data (490). If the consumable is of a type y valid for the particular host, the authentication number x is checked using the authentication function data (490) in a check authentication number process (440). The check authentication number process (440) executes the algorithm defining the authenticating relationship using n and y as input and compares its internally calculated value of $x=F_{M,Q}(G(n,y))$ with the value of x read from the transponder. If they agree, then this is an authenticated media product of type y that is useable on that printer. If a roll of media is detected with an improper authentication code x, then all validity flags and remaining media counters are reset to zero and locked by a reset flags process (475). This counterfeit media is both detected by the printer, and made unusable for any future application once detected by setting its status as "fully used."

A used consumables list data (470) is made available to the host device in this embodiment to confirm that a previously used up cartridge is not being inserted. After the consumable is validated, it is used in the host in a use consumable process (460) as, for example, by using a ribbon cartridge to print product. In one embodiment, when it is determined that the consumable article has been completely expended by the use consumable process (460), an identifier of the consumable article (such as the unique serial number n) will be stored in a used consumable list data (470) indicating that the particular consumable article is completely used. In another embodiment, the used consumable list data (470) can include an identification of all consumable articles loaded into the host device and the percentage of life remaining in each consumable article. The used consumable list data (470) can inexpensively store information regarding a large number of previously used consumables such as, for example, a list of the last 512 print cartridges used in a plastic card printer. If a ribbon cassette or ribbon roll reappears with a higher value of remaining panel count than stored in the plastic card printer memory, the plastic card printer treats the reloaded ribbon cassette or ribbon roll as if it had an invalid authentication, and not only can refuse to use that media, but also can lock its transponder into "fully used" status.

Figure 5:
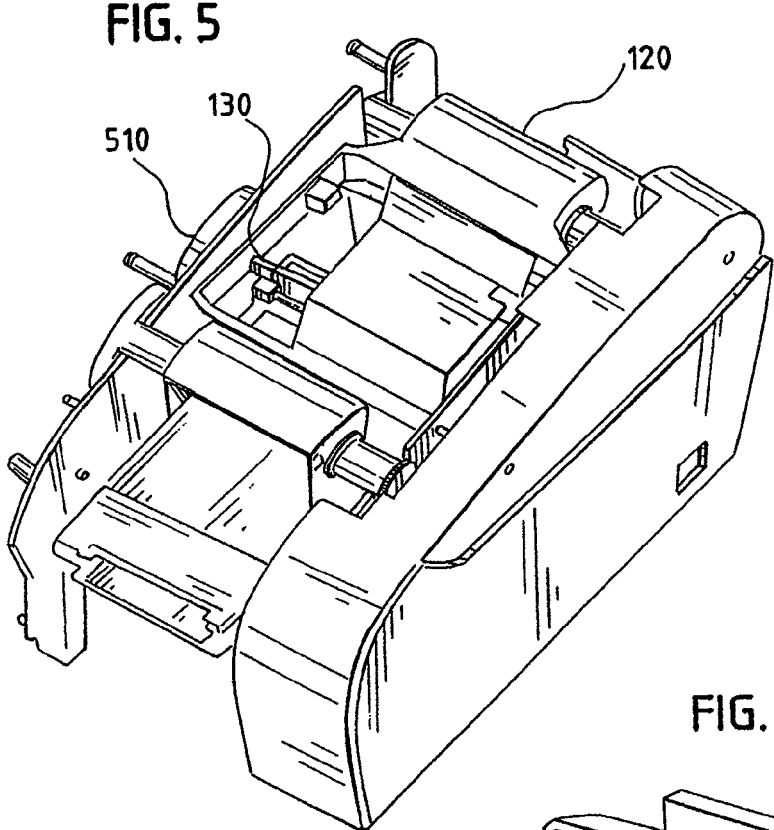
FIG. 5 is a cutaway top left perspective view of a consumable article loaded into a host device illustrating the placement of authenticating components in accordance with one embodiment.
Figure 6:
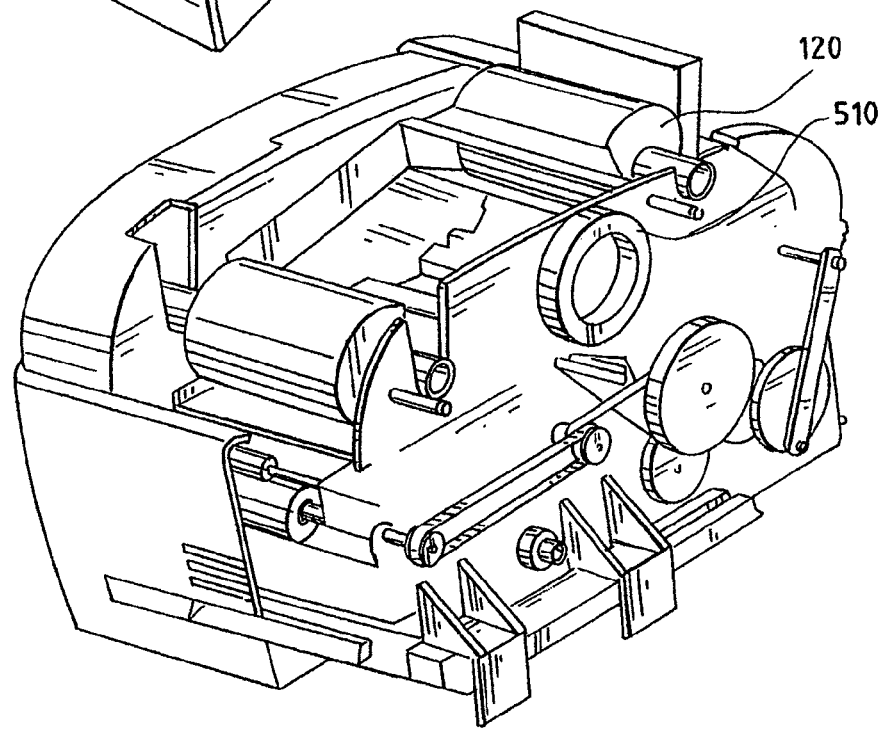
FIG. 6 is a cutaway top right perspective view of a consumable article loaded into a host device illustrating the placement of authenticating components in accordance with one embodiment.

Referring next to the embodiment of FIGS. 5 and 6, there is shown in FIG. 5 a top left perspective cut-away view of an embodiment of a host device containing an authenticatable consumable. FIG. 6 shows a top right perspective cut-away view of an embodiment of a host device containing an authenticatable consumable. The consumable article (120) is shown loaded in the host device (100). A radio frequency identification ("RFID") transponder (130) is shown mounted on the consumable article (120). An antenna (510) in the host device (100) enables it to read information stored in the RFID transponder (130) on the consumable article (100).

Referring next to FIG. 7A-7D there are shown several views illustrating a consumable article. A ribbon cartridge is shown in perspective view in FIG. 7A. The ribbon cartridge consumable article (700) has a source spool (710) on one end, a take up spool (720) on another end, the source spool (710) and the take up spool (720) being connected by a left brace member (730L) and a right brace member (730R). A communications component (740) is shown, which may be a radio frequency identification (RFID) transponder. A print ribbon (750) passes from one spool (710) to the other spool (720) between the brace members (730L, 730R).

Figure 7A:
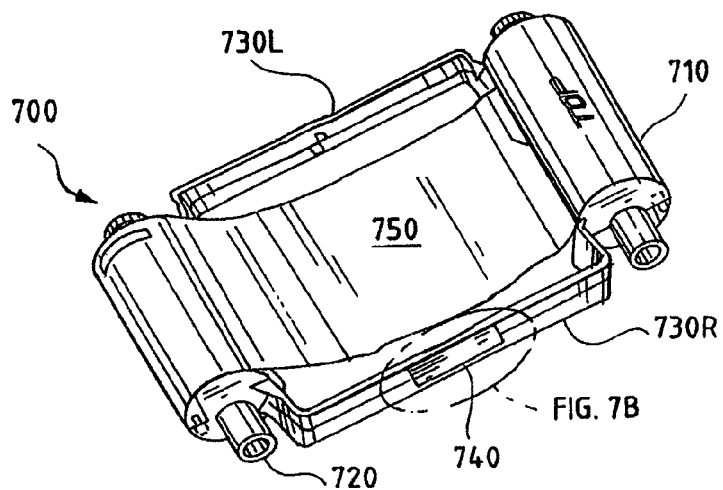
FIG. 7A is a perspective view of a consumable article print cartridge with an authenticator circuit mounted on a side in accordance with one embodiment.
Figure 7B:
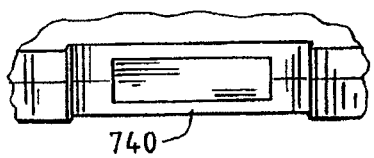
FIG. 7B is an enlarged view of an authenticating component mounted on a consumable article.

FIG. 7B is an expanded view of the communications component (740) RFID transponder label and mounting of an embodiment. The transponder can be located on either the inside or the outside of the left brace member (730L) or the right brace member (730R). A label can also be placed on the brace member describing the RFID transponder.

Figure 7C:
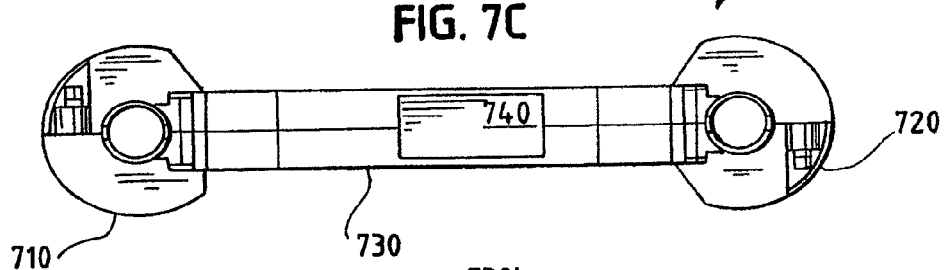
FIG. 7C is a side orthogonal view of a consumable article print cartridge with an authenticator circuit mounted on a side in accordance with one embodiment.

FIG. 7C is a side orthogonal view of a consumable article (700) according to one specific embodiment. The ribbon cartridge consumable article (700) has a source spool (710) on one end, a take up spool (720) on another end, the source spool (710) and the take up spool (720) being connected by a brace member (730). Mounted on the brace member (730) is a communications component (740), which may be an RFID transponder.

Figure 7D:
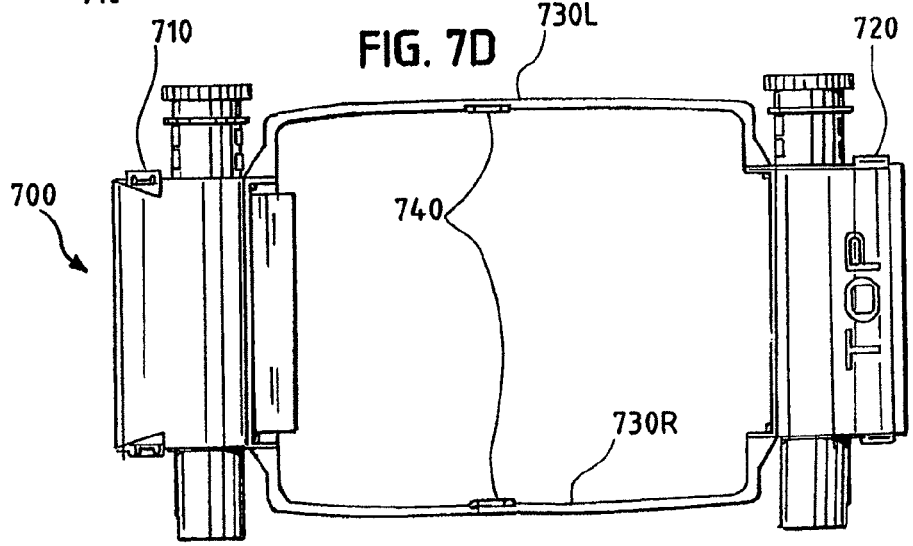
FIG. 7D is a top orthogonal view of a consumable article print cartridge with an authenticator circuit mounted on a side in accordance with one embodiment.

FIG. 7D is a top orthogonal view of a consumable article (700) according to one specific embodiment of the invention. The ribbon cartridge consumable article (700) has a source spool (710) on one end, a take up spool (720) on another end, the source spool (710) and the take up spool (720) being connected by a left brace member (730L) and a right brace member (730R). A communications component (740), which may be an RFID transponder, is mounted on either the left brace member (730L) or the right brace member (730R).

Figure 8:
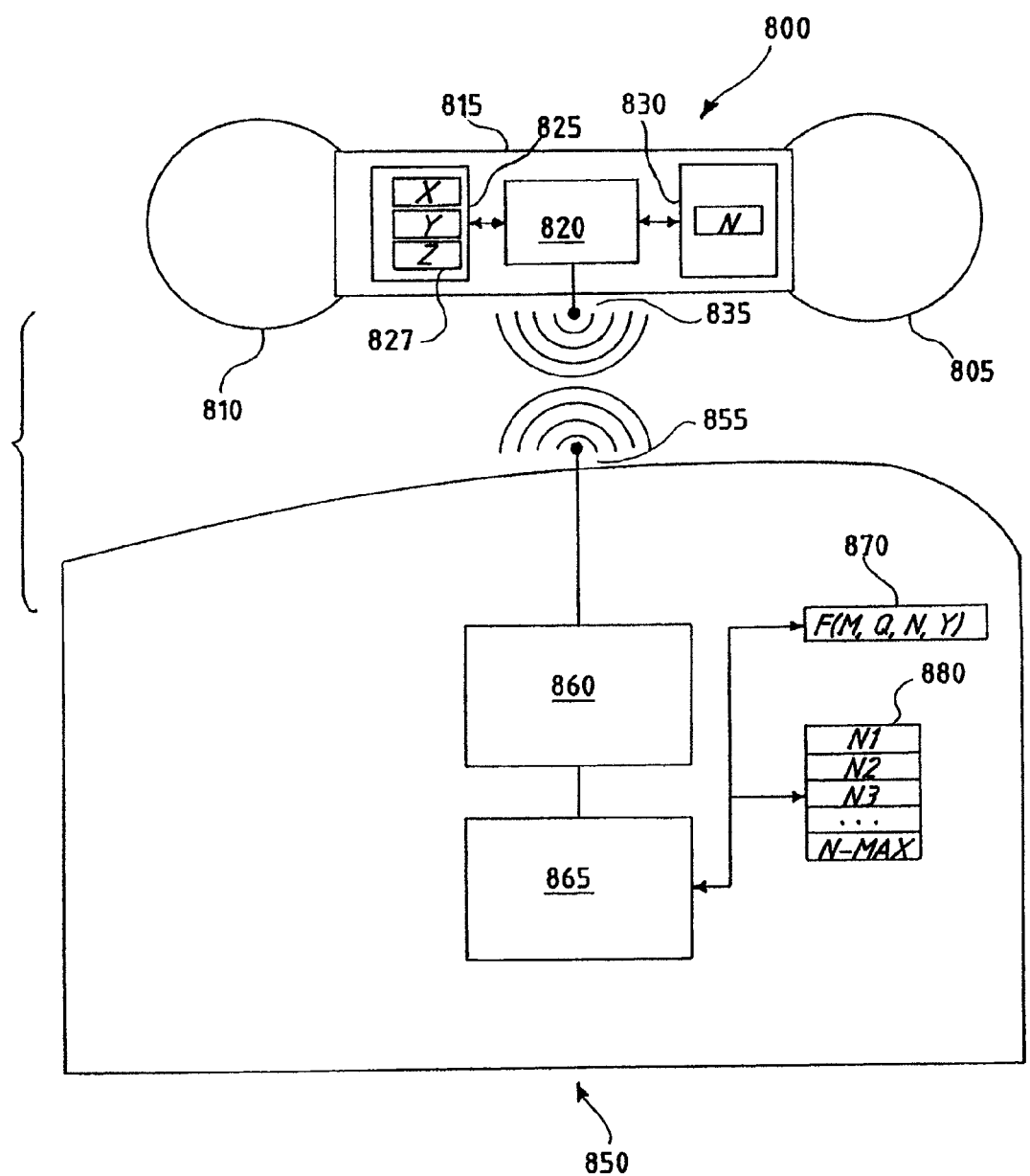
FIG. 8 is a block diagram of a consumable article, host device, and authenticating circuitry in accordance with one embodiment.

Referring now to FIG. 8, a schematic diagram of a consumable article authentication system for authenticating a consumable article in a host device is shown. A consumable article (800) may include, for example, a print ribbon cartridge having a source spool (805), a take-up spool (810), and a brace member (815). The consumable article (800) may include a communications component (820, 835) for transmitting information to a host device (850). The communications component (820, 835), may in one embodiment, be low-cost RFID transponders, having two specific properties. First, the low-cost type of RFID transponders may preferably include a factory programmed unique serial number n (830), which cannot be changed by a user or duplicated by copying a public data area (825) of the transponder into another similar type transponder. Thus each transponder is uniquely numbered, which is a requirement for most types of RFID transponders that have an "anti-collision" protocol enabling multiple transponders to be differentiated when all are seen in the RFID reader antenna field.

Second, the low-cost RFID transponders preferable has the ability to one-time write (or write and lock) data values, x and y, into a public data area (825) of the transponder. The value y in this particular embodiment is the media type information, since not all media types work on all printer types. The non-zero data value x for this illustrative mode will be a complicated function of y and the unique identification number n of that transponder. The value x in this depicted example will be factory programmed into the transponder at the time the media is made, or at least before it leaves the manufacturer's facility.

Both the Philips I*Code and equivalents and any International Standards Organization ("ISO") 15693 standard compliant 13.56 MHz RFID transponders have a factory-programmed, non-copyable 48-bit serial number with the ability to permanently store a corresponding authentication code (derived from the serial number) in the chip. Section 4.1 of ISO 15693 specifies that each compliant transponder shall be identified by a 64-bit Unique Identifier (UID), which shall be set permanently by the IC manufacturer, and shall be structured as follows:

| MSB | | | | | LSB |
|---|---|---|---|---|---|
| 64 | 57 | 56 | 49 | 48 | 1 |
| 'E0' hex | | IC mfr code | | IC manufacturer serial number | |

The most significant byte shall be 'E0' hex, followed by an 8-bit IC manufacturer code, which is assigned per ISO 7816-6/AM1. The 48-bit serial number shall be assigned by the identified IC manufacturer. It is expected that various manufacturers will produce compliant ISO 15693 transponders with factory programmed serial numbers and unique manufacturers' IDs registered under ISO 7816. The manufacturer's unique 8-bit ID, or a list of qualified manufacturers' IDs, can be included as part of the authentication process.

Referring still to the specific embodiment of FIG. 8, a host device (850) includes a communication component (855, 860) for reading the values of n, x, and y stored on the consumable article. A processor (865) can receive the information stored on the consumable article and can use an authentication function (870) F(M,Q,x,y) available to the processor to confirm that an authenticating relationship exists between the authentication code x and the serial number n and the media type code y. The processor (865) is preferably a secure microprocessor. The printer's media authentication program is hidden from potential piracy by being stored in the secure microprocessor. The authentication program cannot be read out from the printer nor can the program be observed during execution. This helps to prevent a potential pirate from determining or reconstructing the authentication algorithm which calculates x for n and y.

The consumable article preferably includes flags (827) to indicate the number of units of media such as panels of ribbon used on the consumable article. Each ribbon roll core or cassette can only be used once. Other memory elements in the transponder keep track of media usage, and remaining media count. Flags in the transponder memory are reset and locked as each unit portion (typically 10-15%) of that media is used. Since only a maximum of 15% of additional media can be reloaded on the core or cassette, this makes reuse of partially used cores or cassettes economically unattractive. Of course, the flags may be used to indicate any degree of usage.

Referring still to the embodiment illustrated in FIG. 8, there is available to the processor (865) a list of consumables used (880). A "cassettes used" list is kept with in each printer. The last 512 cassette serial numbers n and their remaining panel count can be stored in each printer. Should a cassette reappear with a higher value of remaining panel count than stored in the printer memory, the printer can treat the reloaded cassette or ribbon roll as if it had an invalid authentication, and not only refuses to use that media but may lock its transponder into "fully used" status, thus preventing "refilling" of the used media.

Figure 9:
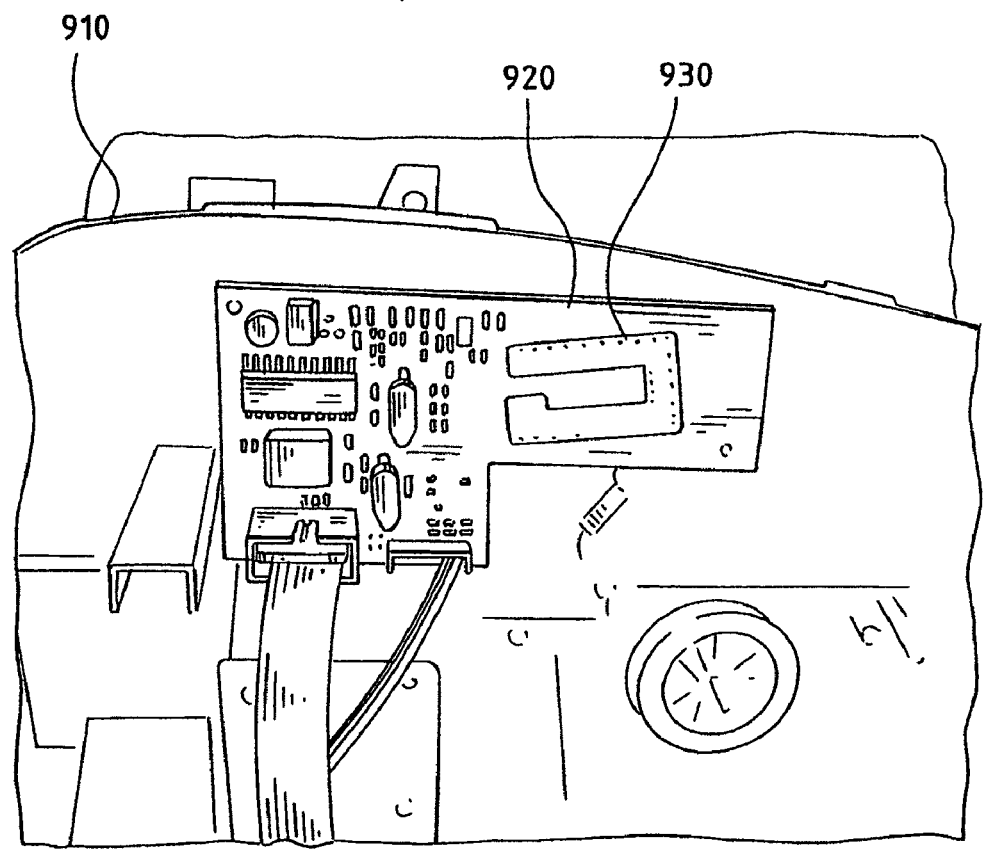
FIG. 9 is a perspective view illustrating placement of a circuit board in a host device for authenticating a consumable article in accordance with one embodiment.

Referring next to FIG. 9, there is shown a specific embodiment of a communications component mounted on a host device for reading a communications component on a consumable article. A host device frame (910) is shown. The particular host device frame (910) here depicted is a plastic card printer frame with the exterior plastic housing removed. A circuit board (920) is mounted on the particular host device frame (910). The circuit board (920) includes an antenna (930) for reading a radio frequency identification transponder (not shown). The antenna (930) on the circuit board (920) is a transceiver for reading the transponder (not shown) on a consumable article to be loaded in the host device frame (910). This transceiver is only one embodiment of a communications component of a mode of reading information stored on a consumable article. Other examples of communications components include electrical contacts for completing a circuit, infrared or other light sensors for communicating with an LED or the like, a mechanical switch set by, for example, electromechanical means, or any suitable means for communicating such a signal.

Figure 10A:
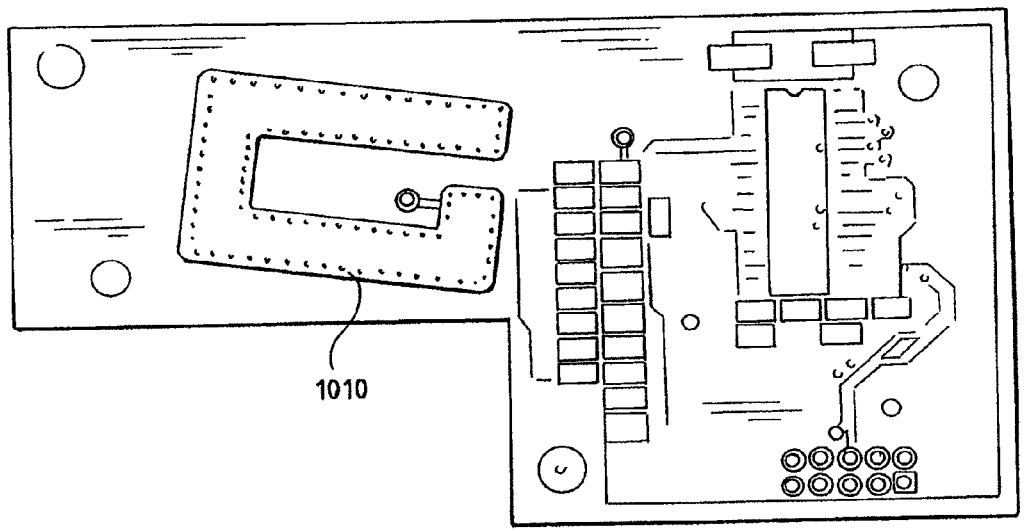
FIG. 10A is a rear orthogonal view of a first embodiment of a circuit board for mounting on a host device to authenticate a consumable article.
Figure 10B:
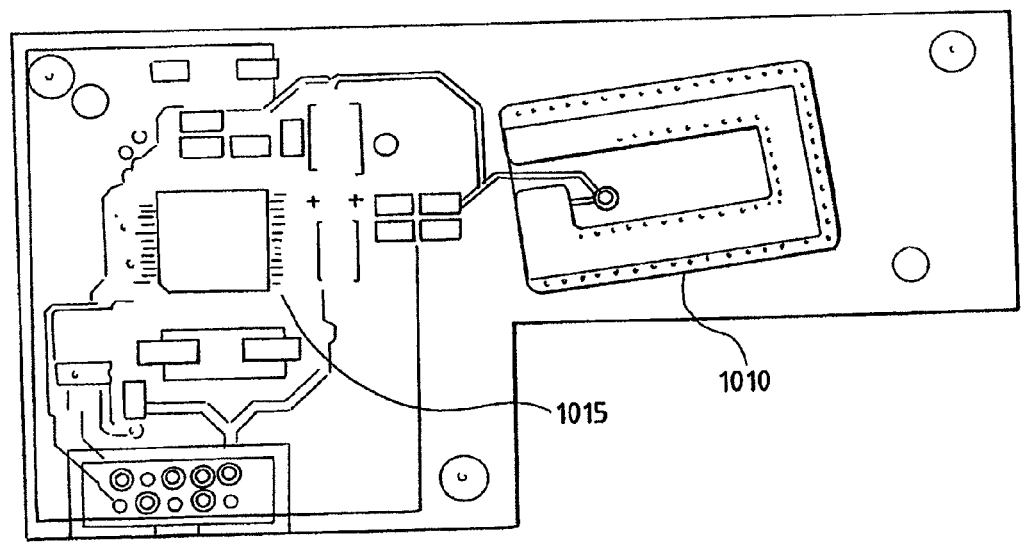
FIG. 10B is a front orthogonal view of a first embodiment of a circuit board for mounting on a host device to authenticate a consumable.

One embodiment of a circuit board suitable for practicing one mode of the invention is shown in FIG. 10A and FIG. 10B. FIG. 10A is the obverse of the circuit board and FIG. 10B is the reverse. A receptacle (1015) is provided on the circuit board in this particular embodiment for including a microprocessor. As described with respect to FIG. 8. The printer's media authentication program is preferably hidden from potentially piracy by being stored in a secure microprocessor.

Figure 11:
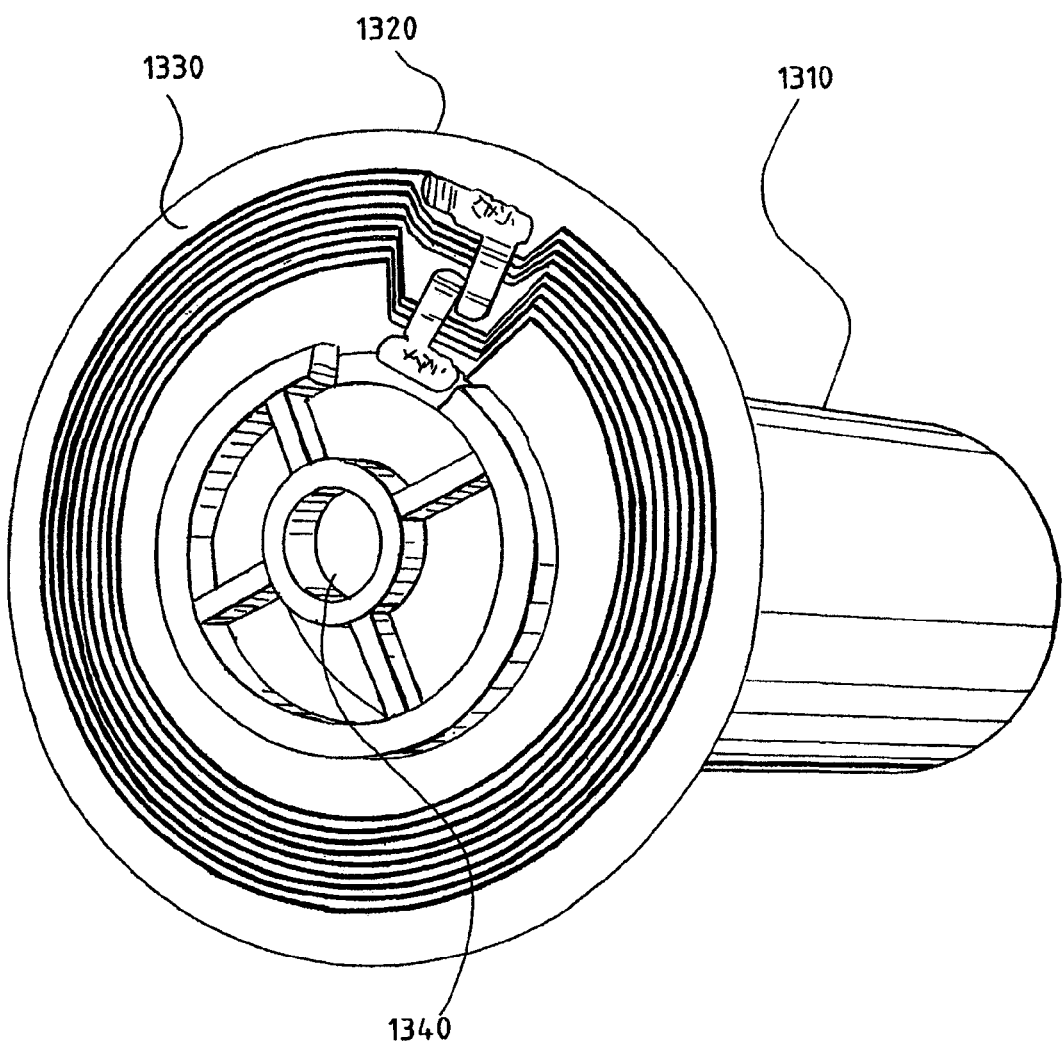
FIG. 11 is a perspective view of a consumable article print cartridge spool with an authenticator circuit mounted on a flange in accordance with one embodiment.

Referring next to FIG. 11, an alternative embodiment of a communications component for mounting on a consumable article is shown. A spool (1310) is provided for use in a consumable article. In one embodiment the consumable article can be, for example, a ribbon cartridge for use in a host device. In another embodiment the consumable article can be, for example, a roll of film for use in a camera. The ribbon or media is wound about the spool (1310). A flange (1320) is associated with the spool (1310). The flange (1320) can be located on one end of the spool (1310) or at any convenient location associated with the spool (1310). In the illustrated embodiment, conductive strips (1330) disposed on the flange in concentric rings serve as a communications component to transmit information stored on the consumable article to a host device.

Figure 12A:
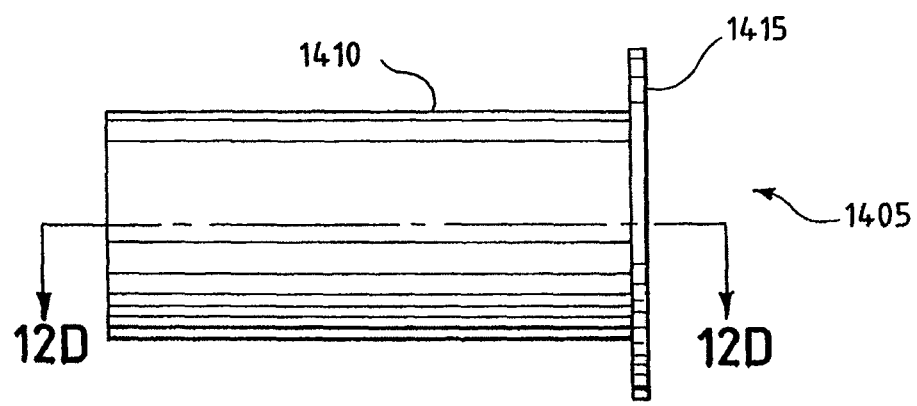
FIG. 12A is side orthogonal view of a consumable article print cartridge spool with an authenticator circuit mounted on a flange in accordance with one embodiment.

Referring next to FIG. 12A-12D, there are shown several views of a part for use in a consumable article. FIG. 12A is a side orthogonal view of a winding spool (1405). A winding drum (1410) is provided about which media can be wound, such as ribbon in a print cartridge for use in a printer or film in a roll of film for use in a camera. A flange (1415) is associated with the winding drum and can, for example, be attached to one end of the winding drum. Other configurations are possible and are considered to be equivalent A communications component can be mounted on the flange for communicating with a host device such as a printer or camera.

Figure 12B:
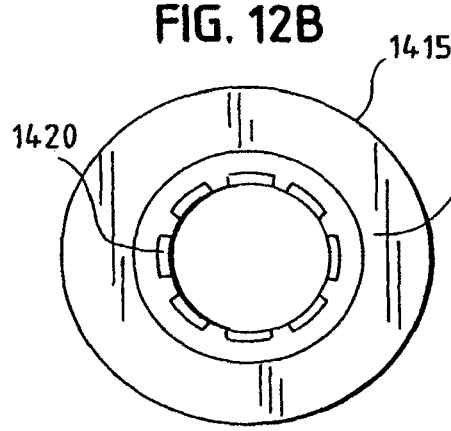
FIG. 12B is a first end orthogonal view of a consumable article print cartridge spool with an authenticator circuit mounted on a flange in accordance with one embodiment.
Figure 12C:
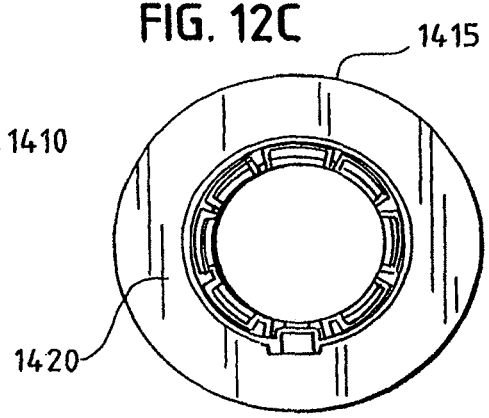
FIG. 12C is a second end orthogonal view of a consumable article print cartridge spool with an authenticator circuit mounted on a flange in accordance with one embodiment.

FIG. 12B is an end orthogonal view from the end opposite the flange (1415) on the winding drum (1410). In the particular embodiment shown, the winding drum (1410) is hollow, having an interior surface (1420) defining a cavity. FIG. 12C is an end orthogonal view from the end on which the flange (1415) is mounted. Again visible is the interior surface (1420) defining the hollow cylindrical cavity found in this particular embodiment.

Figure 12D:
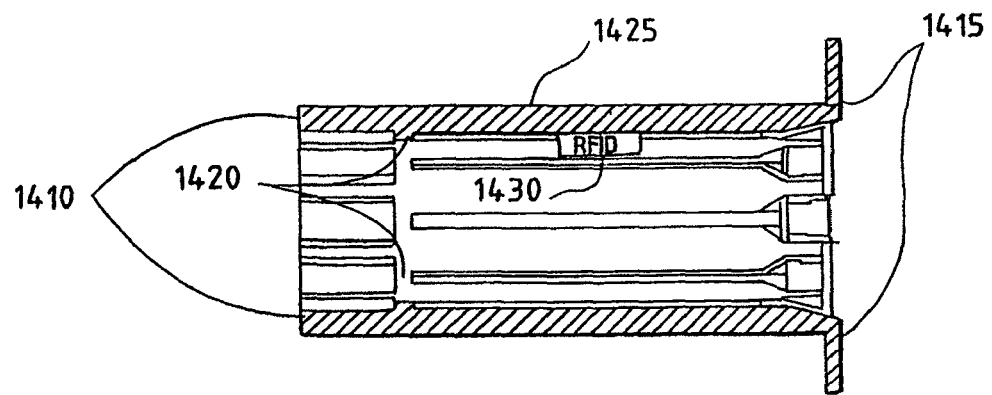
FIG. 12D is a sectional side orthogonal view of a consumable article print cartridge spool with an authenticator circuit mounted on a flange in accordance with one embodiment.

Referring now to FIG. 12D, there is shown a sectional view along cut line A-A of the view shown in FIG. 12A. The spindle (1405) has a winding drum (1410) with an outer surface (1425) about which media such as a ribbon for a printer or film for a camera can be wrapped. An interior surface (1420) in this embodiment defines a cavity in the hollow interior. A flange (1415) on one end can be used to mount a communications component, such as an RFID transponder. In an alternate embodiment, a first communications component (1430), such as an RFID transponder, may be mounted on the interior surface (1420), which communicates with the host device by means of a second communication component (not shown) disposed axially within the hollow cavity defined by the interior wall of the spool.

Figure 13:
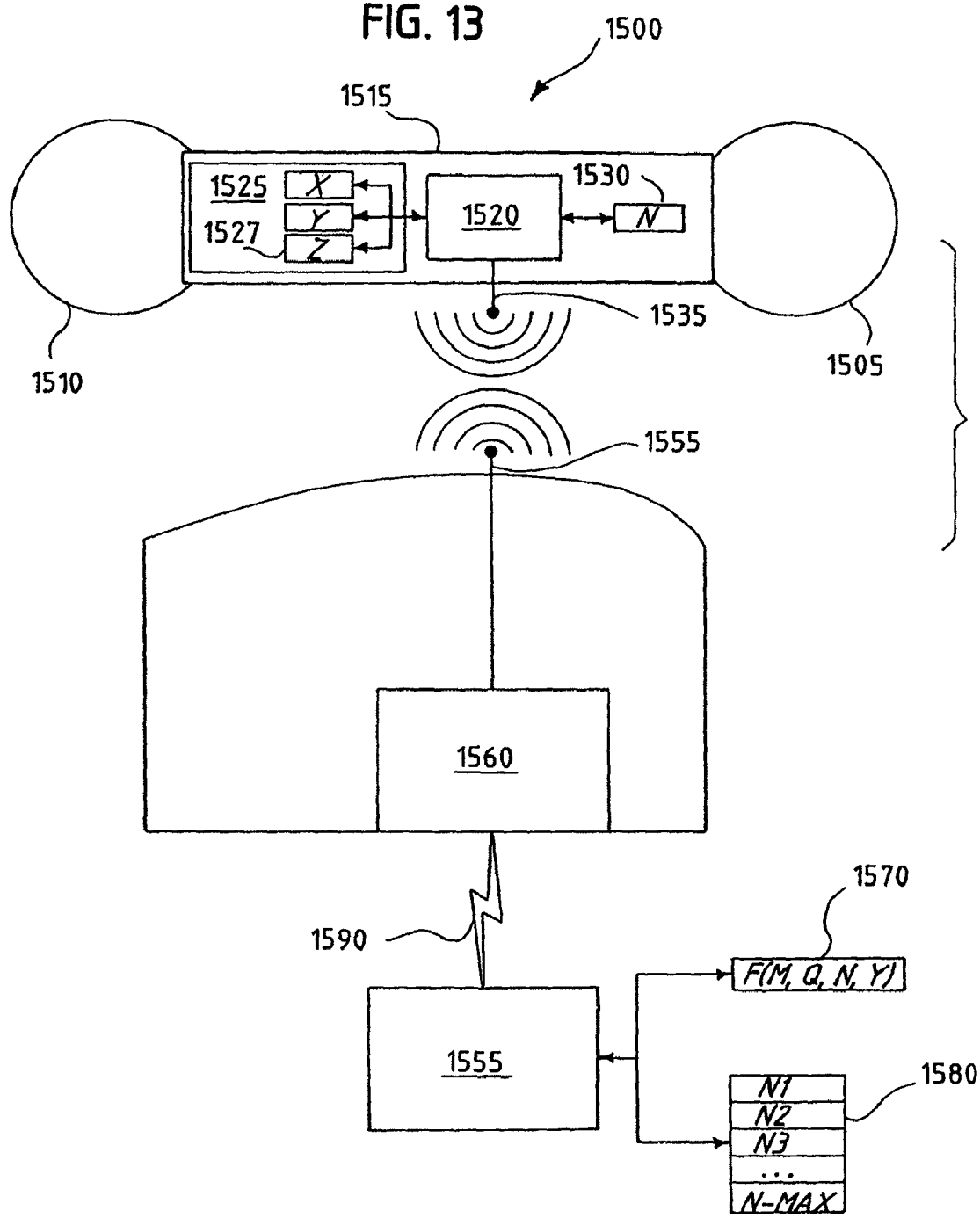
FIG. 13 is a block diagram of a consumable article, host device, and authenticating circuitry in accordance with an embodiment using a network connection.

Referring now to FIG. 13, there is disclosed a schematic diagram of a consumable article authentication system for authenticating a consumable article in a host device. A consumable article (1500) may include, for example, a print ribbon cartridge having a source spool (1505), a take-up spool (1510), and a brace member (1515). The consumable article (1500) may include a communications component (1520, 1535) for transmitting information to a host device (1550). In one embodiment, the communications component (1520, 1535), may be a low-cost RFID transponder having two specific properties. First, the low-cost RFID transponders can preferably include a factory programmed unique serial number n (1530), which cannot be changed by a user, or duplicated by copying a public data area (1525) of the transponder into another similar type transponder. Thus each transponder is uniquely numbered, which is a requirement for most types of RFID transponders that have an "anti-collision" protocol enabling multiple transponders to be differentiated when all are seen in the RFID reader antenna field.

Second, the low-cost type of RFID transponders can preferably have the ability to one-time write (or write and lock) data values, x and y, into a public data area (1525) of the transponder. The value y in this particular embodiment is the media type information, since not all medias work on all printer types. The non-zero data value, x, for this illustrative mode will be a complicated function of y and the unique identification number n of that transponder. The value x in this depicted example can be factory programmed into the transponder at the time the media is made, or at least before it leaves the manufacturer's warehouse.

Also shown is a host device (1550), which includes a communication component (1555, 1560) for reading the values of n, x, and y stored on the consumable article. A processor (1565) can receive the information stored on the consumable article and can use an authentication function (1570) F(M,Q,x,y) available to the processor to confirm that an authenticating relationship exists between the authentication code x and the serial number n and the media type code y. The processor (1565) can be remote from the host device and may communicate with the host device through a communications channel (1590), such as a network or a telecommunications link.

The consumable article preferably includes flags (1527) to indicate the number of units of media, such as panels of ribbon, used on the consumable article. Each ribbon roll core or cassette can only be used once. Other memory elements in the transponder keep track of media usage, and remaining media count. Flags in the transponder memory can be reset and locked as each portion (typically 10-15%) of that media is used. Because only a maximum of 15% of additional media can be reloaded on the core or cassette, this makes reuse of partially used cores or cassettes economically unattractive.

Referring still FIG. 13, there is available to the processor (1565) a list of consumables used (1580). A "cassettes used" list is kept in each printer. The last 512 cassette serial numbers n and their remaining panel count are stored in each printer. Should a cassette reappear with a higher value of remaining panel count than stored in the printer memory, the printer treats the reloaded cassette or ribbon roll as if it had an invalid authentication, and not only refuses to use that media but locks its transponder into "fully used" status.

Implementation of the above described method and apparatus includes repeated operations of the form $M^N$, where M and N are both large prime numbers. When M and N are both large prime numbers, then $M^N$ can be theoretically become hundreds of digits (or bits). To better implement the above described authentication algorithm, a method has been derived that allows both $M^N$ to be quickly evaluated in a small microprocessor and restrict the number of bits to twice the length of Q.

As an example, assume that M<<Q and Q is 64 bits, so that a 64-bit times 64-bit multiply (128-bit result) is all that is required. This example is offered by way of illustration, and other embodiments are possible.

Let N be defined as a 64-bit binary number, which is some function of n and y.

$$N(n,y) = c_0 2^0 + c_1 2^1 + \ldots + c_{63} 2^{63} = \sum_{i=0}^{63} c_i 2^i \qquad \text{Equation 1}$$

In this equation, each $c_i$ represents successive binary digits. Substituting the above into $M^N$ yields:

$$M^N = M^{c_0 2^0 + c_1 2^1 + \ldots + c_{63} 2^{63}} = M^{\sum_{i=0}^{63} c_i 2^i} \qquad \text{Equation 2}$$

$$M^N = \prod_{i=0}^{63} M^{c_i 2^i}$$

Using this transformation of $M^N$, the equation $M^N \bmod Q$ can be evaluated using the lemma:

$$(a \times b) \bmod c = [(a \bmod c) \times (b \bmod c)] \bmod c \qquad \text{Equation 3}$$

Applying this lemma yields:

$$M^N \bmod Q = \left( \prod_{i=0}^{63} (M^{c_i 2^i}) \bmod Q \right) \bmod Q \qquad \text{Equation 4}$$

Letting $$T_i = (M^{c_i 2^i}) \bmod Q \qquad \text{Equation 5}$$

then $$M^N \bmod Q = \left(\prod_{i=0}^{63} T_i\right) \bmod Q \qquad \text{Equation 6}$$

Each term $T_i$ can now be evaluated using the fact that each $c_i$ is either 0 or 1.

if $c_i=0$ then $T_i = M^{c_i 2^i} \bmod Q = M^0 \bmod Q = 1$ if $c_i=1$ then $T_i = M^{c_i 2^i} \bmod Q = M^{2^i} \bmod Q$ \qquad Equation 7

The up to 64 values of $T_i$ for $c_i=1$ can be either be previously calculated and stored in a table or can be sequentially evaluated. Using this table or these calculated values for $T_i$, the value of $M^N$ mod Q can be evaluated progressively. Let $P_i$ be the partial product at each stage, i, from 1 to 63. Calculating in a recursive, pair-wise manner:

$$P_1 = (T_0 \times T_1) \bmod Q \qquad \text{Equation 8}$$
$$P_2 = (P_1 \times T_2) \bmod Q$$
$$\vdots$$
$$P_i = (P_{i-1} \times T_i) \bmod Q$$

until $$M^N \bmod Q = P_{63} = (P_{62} \times T_{63}) \bmod Q \qquad \text{Equation 9}$$

Using the fact that when $c_i=0$ then $T_i=1$ cuts the number of 64×64 bit multiplication operations by 50% on the average. In order to implement the security system described herein, however, there remains a need for a fast 64-bit modulo Q operation on a 128-bit number.

For each of the steps above when $c_i=1$ a reduction of form (W mod Q) must be performed. Normally, this is done by an integer long division operation to find the integer remainder. In the case here, where the divisor Q is of order 64 bits and the dividend W is of order 128 bits, a great number of shift and subtract operations must be performed.

To better implement the security system described herein, a method that is approximately 20 times faster than long division has been developed. Assume that Q is chosen to be $$Q = 2^n - k, \text{ where } k \ll 2^n \qquad \text{Equation 10}$$

This includes the Mersenne Prime numbers, of form $2^n - 1$. But, if (W div Q) can be accurately estimated (that is, the integer quotient of the division operation) then the remainder can easily be easily found by:

$$W \bmod Q = W - Q \times (W \operatorname{div} Q) \qquad \text{Equation 11}$$

The integer quotient of the division operation can be estimated as follows. First, write the equivalence $$W \operatorname{div} Q = \operatorname{int}\left(\frac{W}{2^n - k}\right) \qquad \text{Equation 12}$$

Multiplying both the numerator and denominator of the right side by $2^{-n}$ yields $$W \operatorname{div} Q = \operatorname{int}\frac{2^{-n}W}{1 - 2^{-n}k} \qquad \text{Equation 13}$$

Because Q is typically larger (here on the order of n ~63 bits), then $(2^{-n}k) \ll 1$ and the denominator in Equation 14 can be expanded using the infinite series $$\frac{1}{1-u} = \sum_{i=0}^{\infty} u^i \qquad \text{Equation 14}$$

Substituting Equation 14 into Equation 13 yields:

$$W \operatorname{div} Q = \operatorname{int}\left(2^{-n}W \sum_{i=0}^{\infty} (2^{-n}k)^i\right) \qquad \text{Equation 15}$$

Evaluating the first few terms of Equation 15 reveals that $$W \operatorname{div} Q \approx \operatorname{int}(2^{-n}W + w^{-2n}kW + 2^{-3n}k^2w + \ldots) \qquad \text{Equation 16}$$

Knowing the maximum values of n, k, and W, one can evaluate the terms of Equation 16 until the first term is found which is sufficiently small (such as less than ½) so that further terms will not affect the integer portion since all subsequent terms will be smaller. These terms that will not affect the value of the integer portion can then be safely ignored in the evaluation of Equation 16.

In practice, W, Q and k can be chosen so that Equation 16 converges after only a few terms. This method of calculating W mod Q proves in practice to be many times faster than finding it by long division directly.

As another example of an alternate embodiment, the consumable and the host can communicate by an optical coupling. Other examples include electrical contracts and magnetic read-write heads. This invention is not limited to any of the particular exemplary modes of communication between the consumable and the host enumerated in this description, and the claims below are intended to cover any suitable mode of communication.

Whereas the invention has been described as being preferably applied to a media processing system in the form of a thermal transfer printer, the invention has equal applicability to thermal printers, such as described in U.S. Pat. Nos. 5,266,968 and 5,455,617, photoprocessing apparatus, such as described in U.S. Pat. No. 6,106,166, photographic cameras, such as described in U.S. Pat. No. 6,173,119, X-ray cameras, such as described in U.S. Pat. No. 5,428,659, ink jet printers, laser printers, and the like. Whereas the invention has been depicted as applied to a media processing system wherein the media assembly and media processing system communicate wirelessly, the invention is also readily adapted for use in systems wherein the media assembly and media processing system communicate by a wired connection, as shown in U.S. Pat. Nos. 5,266,968 and 5,455,617.

Specific embodiments of the present method and apparatus have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

The invention claimed is:

1. A media holder for use with a media processor, the media holder comprising:
   a media supply spool;
   a media take-up spool;
   first and second braces extending generally between the media supply spool and the media take-up spool; and
   a transponder supported by at least one of the first and second braces, the transponder comprising:
      an antenna; and
      a memory disposed in communication with the antenna, the memory storing an identification number, a media type, and an authentication number, wherein the authentication number is at least partially a transformation of the identification number and the media type.

2. The media holder of claim 1, wherein the transformation of the identification number comprises cryptographic methods.

3. The media holder of claim 1, wherein the transformation of the identification number and the media type comprises cryptographic methods.

4. The media holder of claim 1, wherein the identification number is a transponder serial number sized between 32 and 64 bits.

5. The media holder of claim 1 further comprising a media supply spool configured to support a ribbon comprising panels, wherein the memory comprises a plurality of memory units, and wherein at least one of the plurality of memory units is configured to be locked.

6. The media holder of claim 5, wherein at least one of the plurality of memory units is configured to be locked in connection with media usage.

7. The media holder of claim 6, wherein at least one of the plurality of memory units is configured to be locked in connection with media usage of between 10 to 15 percent of the ribbon panels.

8. A media holder comprising:
   a media cartridge comprising:
      a media take-up spool;
      a media supply spool comprising media, the media comprising a plurality of media panels;
      first and second braces extending generally between the media supply spool and the media take-up spool; and
      a transponder supported by at least one of the first and second braces, the transponder comprising:
         an antenna; and
      a memory disposed in communication with the antenna, the memory storing an identification number, an authentication number, a media type, a plurality of memory units that are configured to be locked, and wherein at least one of the plurality of memory units is configured to be locked in connection with usage between 10 to 15 percent of the media panels.

9. The media holder of claim 8, wherein the authentication number is at least partially a transformation of the identification number.

10. The media holder of claim 9, wherein the transformation of the identification number comprises cryptographic methods.

11. The media holder of claim 8, wherein the authentication number is at least partially a transformation of the identification number and the media type.

12. The media holder of claim 11, wherein the transformation of the identification number and the media type comprises cryptographic methods.

13. The media holder of claim 8, wherein the media is a ribbon comprising ribbon panels.

14. The media holder of claim 8, wherein at least one of the plurality of memory units is configured to lock the identification number.

15. The media holder of claim 8, wherein at least one of the plurality of memory units is configured to lock the media type.

16. The media holder of claim 1, further comprising:
   a media supply spool;
   a media take-up spool; and
   first and second braces extending generally between the media supply spool and the media take-up spool, wherein the transponder is supported by one of the first and second braces.

17. The media holder of claim 1, further comprising:
   a media supply spool comprising:
      a winding drum defining an axis and a first diameter, and
      a flange defining a second diameter that is larger than the first diameter, wherein the antenna of the transponder is positioned on the flange and extends at least partially around the axis of the winding drum.

18. The media holder of claim 8, further comprising:
   a media cartridge comprising the media supply spool, a media take-up spool, and first and second braces extending generally therebetween, wherein the transponder is supported by one of the first and second braces.

19. The media holder of claim 8, wherein the media supply spool comprises:
   a winding drum defining an axis and a first diameter, and
   a flange defining a second diameter that is larger than the first diameter, and wherein the antenna of the transponder is positioned on the flange and extends at least partially around the axis of the winding drum.

* * * * *